United States Patent
Bar-Or et al.

(10) Patent No.: US 11,011,145 B2
(45) Date of Patent: May 18, 2021

(54) INPUT DEVICE WITH A VARIABLE TENSIONED JOYSTICK WITH TRAVEL DISTANCE FOR OPERATING A MUSICAL INSTRUMENT, AND A METHOD OF USE THEREOF

(71) Applicant: ARCANA INSTRUMENTS LTD., Tel Aviv (IL)

(72) Inventors: Jonathan Bar-Or, Pardes Hanna (IL); Haim Kairy, Hod Hasharon (IL); Boaz Rienschrieber, Karmei Yosef (IL); Oren Gabriel Alsheich, Tel Aviv (IL)

(73) Assignee: ARCANA INSTRUMENTS LTD., Tel Aviv (IL)

( * ) Notice: Subject to any disclaimer, the term of this patent is extended or adjusted under 35 U.S.C. 154(b) by 0 days.

(21) Appl. No.: 17/079,973

(22) Filed: Oct. 26, 2020

(65) Prior Publication Data

US 2021/0043177 A1    Feb. 11, 2021

Related U.S. Application Data

(63) Continuation of application No. PCT/IL2019/050478, filed on Apr. 30, 2019.

(30) Foreign Application Priority Data

Apr. 30, 2018   (IL) .......................................... 259059

(51) Int. Cl.
*G10H 1/34* (2006.01)
*G10H 1/00* (2006.01)
*G10H 3/18* (2006.01)

(52) U.S. Cl.
CPC .......... *G10H 1/0091* (2013.01); *G10H 1/342* (2013.01); *G10H 3/186* (2013.01);
(Continued)

(58) Field of Classification Search
CPC .......... G10H 1/0008; G10H 2240/131; G10H 2220/315; G10H 2230/145;
(Continued)

(56) References Cited

U.S. PATENT DOCUMENTS 5,167,179 A    12/1992  Yamauchi et al.
6,327,367 B1   12/2001  Vercoe et al.
(Continued)

FOREIGN PATENT DOCUMENTS

JP    2000276151 A    10/2000
JP    2010028154 A    2/2010

OTHER PUBLICATIONS

International Search Report and Written Opinion issued in App. No. PCT/IL2019/050478 dated Aug. 13, 2019.

*Primary Examiner* — Marlon T Fletcher
(74) *Attorney, Agent, or Firm* — Snell & Wilmer L.L.P.

(57) ABSTRACT

An input device for operating a musical instrument having musical behavior of string instruments, which comprises a key plate unit containing a set of input keys to be pressed by a player, in order to generate a first set of electric input signals, which emulate a combination of pressed keys of a musical instrument or a combination of pressed strings; a stick unit with variable tension of displacement including a stick to be moved by the player between predetermined discrete positions, which emulate a combination of strummed strings of a musical instrument.

19 Claims, 32 Drawing Sheets
(7 of 32 Drawing Sheet(s) Filed in Color)

(52) U.S. Cl.
CPC . *G10H 2210/155* (2013.01); *G10H 2220/315* (2013.01); *G10H 2240/211* (2013.01)

(58) Field of Classification Search
CPC ....... G10H 2220/161; G10H 2220/091; G10H 1/346; G10H 1/36; G10H 2220/221; G10H 1/186; G10H 2250/451; G10H 2220/00; G10H 2220/275; G10H 2220/281; G10H 2230/065; G10H 2250/445; G10H 3/00; G10H 5/005; G10G 1/00; G10G 3/04; G10C 3/12; G10C 3/00; G10C 5/10; B25J 11/004
See application file for complete search history.

(56) References Cited

U.S. PATENT DOCUMENTS

| | | | |
|---|---|---|---|
| 2002/0094866 A1* | 7/2002 | Takeda | G10H 1/46 463/35 |
| 2003/0131715 A1* | 7/2003 | Georges | G10H 1/0025 84/609 |
| 2004/0089141 A1* | 5/2004 | Georges | G10H 1/365 84/609 |
| 2007/0021208 A1* | 1/2007 | Mao | G06F 3/0325 463/36 |
| 2007/0180978 A1* | 8/2007 | Ozaki | A63F 13/2145 84/602 |
| 2008/0053293 A1 | 3/2008 | Georges et al. | |
| 2010/0315268 A1* | 12/2010 | Ward | G10H 1/34 341/22 |
| 2013/0192446 A1* | 8/2013 | Read | G10H 1/0066 84/609 |
| 2015/0268920 A1 | 9/2015 | Schapiro | |
| 2015/0302839 A1* | 10/2015 | Georges | G10H 7/02 84/645 |
| 2017/0109127 A1* | 4/2017 | Osborn | G10H 1/0058 |
| 2020/0316483 A1* | 10/2020 | Reese | A63H 33/26 |

\* cited by examiner

50a

50b 55
50c
String limiter

55
Switch angles

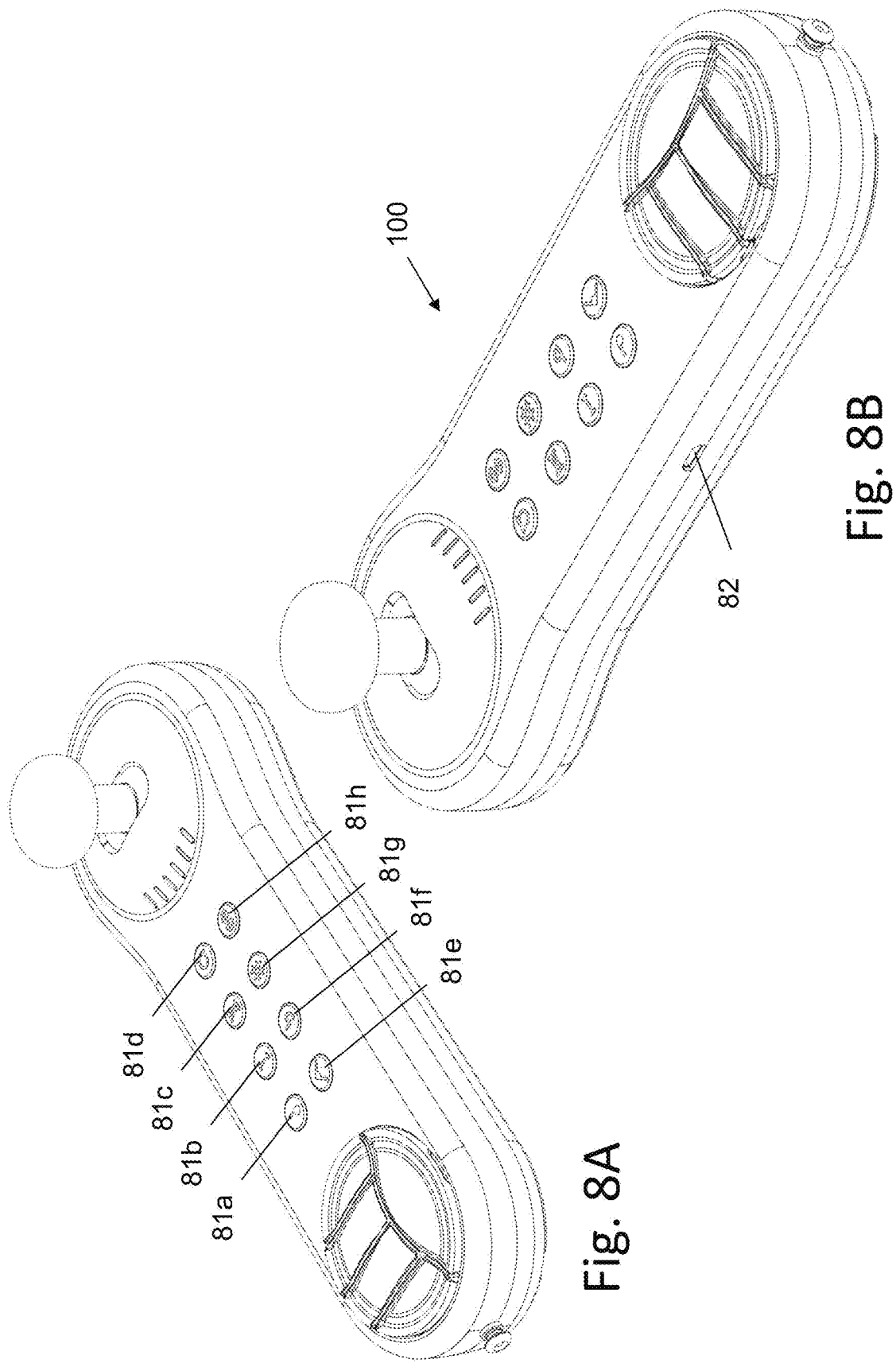

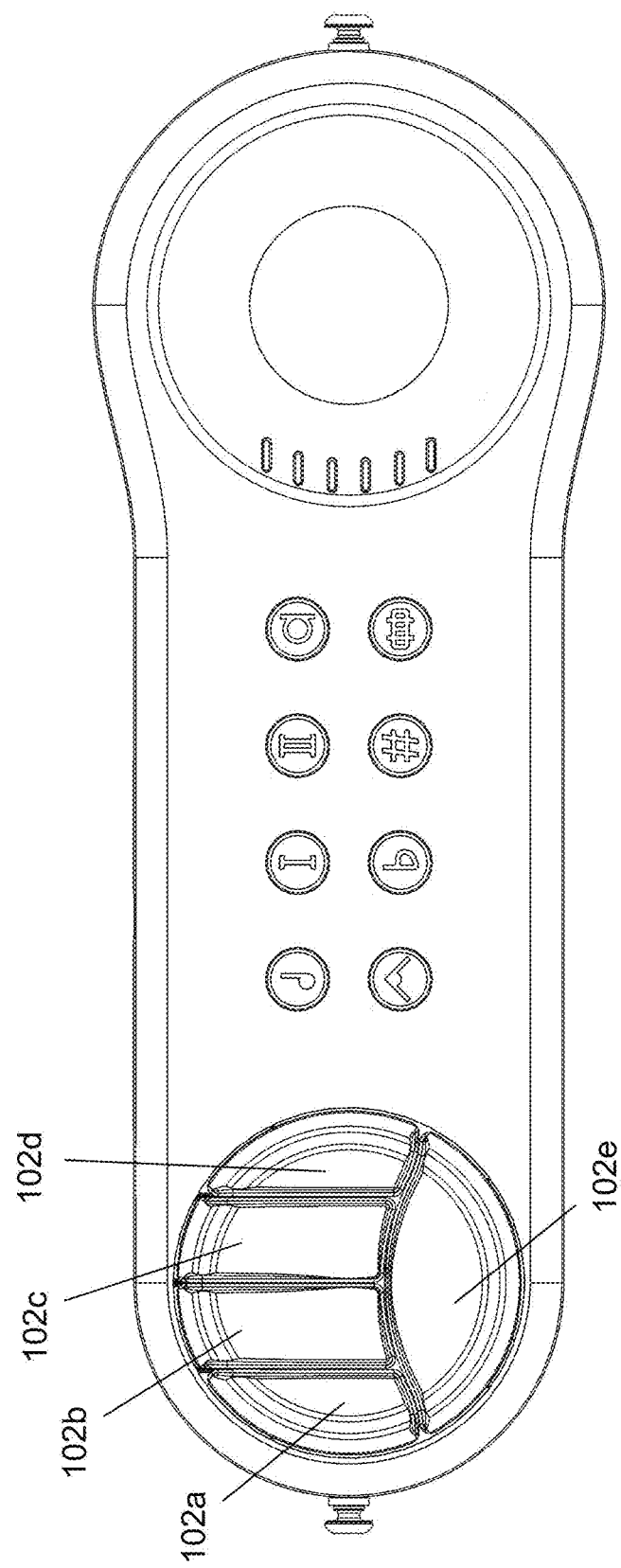

INPUT DEVICE WITH A VARIABLE TENSIONED JOYSTICK WITH TRAVEL DISTANCE FOR OPERATING A MUSICAL INSTRUMENT, AND A METHOD OF USE THEREOF

CROSS-REFERENCE TO RELATED APPLICATIONS

This application is a continuation of, claims priority to and the benefit of, PCT/IL2019/050478, filed Apr. 30, 2019 and entitled "AN INPUTE DEVICE WITH A VARIABLE TESNIONSED JOYSTICK WITH TRAVEL DISTANCE FOR OPERATING A MUSICAL INSTRUMENT, AND A METHOD OF USE THEREOF," which claims priority to and the benefit of Israeli Application No. 259059 filed Apr. 30, 2018, both which are hereby incorporated by reference in their entirety for all purposes.

FIELD OF THE INVENTION

The present invention is in the field of musical instruments. More specifically, the invention relates to an input device with a variable tensioned joystick with travel distance for operating a musical instrument, to be used by handicapped players.

BACKGROUND OF THE INVENTION

Music is the most comprehensive communication mean, which can connect players all around the world. Musical instruments have been developed over the years of human development. However, no standard musical instrument is adapted to players with physical disabilities.

Learning to play music is a complex task, especially for players with physical and motoric disabilities, such as cerebral palsy. Most of the musical instruments, such as a guitar or a piano require full control and coordination of both hands, which are complex and difficult even for capable players. Also, different types of movements are concurrently required from each hand. For example, while playing guitar, the player uses one hand for strumming and the other hand for pressing the strings, in order to generate a desired chord. One player's hand is in charge of executing chord finger positions on the guitar neck, such that the player's fingers press on guitar strings at different fret locations (fixed positions on the neck) to produce different tones. Strumming the guitar strings with the other hand produces a musical chord. When moving from one chord position to another one, in order to eliminate the generation of tones outside the intended harmony, the player usually mutes unintended strings from continuing to vibrate by changing finger positions, covering strings or dampening strings with his fingers.

Music playing is a controlled physical activity over a period of time. An average song is about 3:30 minutes. During musical activity, be it a lesson, solo practice or with a band, the player usually plays in constant time and with controlled velocity. As opposed to professional musicians, novice players play with less accurate "time" or rhythm, and a wider, less-controlled range of velocity. Involuntary movements (such as jerks and muscle spasm) can be extremely frustrating when trying to control a traditional instrument like a piano or guitar, making the instrument unplayable. Such involuntary movements should therefore be detected and filtered.

With traditional music instruments such as a piano or guitar, the sound produced by the instrument is heard immediately on activation of the string or key. For example, when a guitar string is plucked, the sound and acoustics of the vibrating string travels at the speed of sound to the players ear (in less than one millisecond) thus creating immediate feedback for the musician that the string was plucked.

With digital instruments, there is an inherited feedback delay due to additional digital processing that is needed to: read input->process and analyze data->generate sound. This delay is referred to as "Latency".

Latency above 10 ms creates enough delay to render the instrument unplayable by musicians Latency below 6 ms can rarely be detected by most humans Latency between 6-10 ms makes it very difficult to play accurately, and causes fatigue over even a short period of playing time Such latency should therefore be minimized.

It is therefore an object of the present invention to provide an input device with a variable tensioned joystick with travel distance for operating a musical instrument.

It is another object of the present invention to provide an input device with a combination of a variable tensioned joystick with travel distance and a set of keys for operating a musical instrument, which is suitable to be used by handicapped players.

It is a further object of the present invention to provide an input device with a combination of a variable tensioned joystick with travel distance and a set of keys for operating a musical instrument, which is suitable to generate multiple tones and chords using minimal movements.

It is yet another object of the present invention to provide an input device with a combination of a variable tensioned joystick with travel distance and a set of keys for operating a musical instrument, which allows each player to develop a unique playing style or unique way of the players' musical expression.

Other objects and advantages of the invention will become apparent as the description proceeds.

SUMMARY OF INVENTION

Definitions

Monophony—this term refers to music with a single melody (or "tune").

Polyphony—music with more than one part, which indicates simultaneously tones.

A Chord—in music, is any harmonic set of pitches consisting of two or more (usually three or more) tones (also called "pitches") that are heard as if sounding simultaneously. In string instruments, it can be played in "freestyle"—playing on all strings simultaneously in up and down movements, or in "arpeggio"—by breaking the chord tones to be played or sung in a rising or descending order.

Dynamic—in music means how loud quiet the music is. In a string instrument, the dynamic is influenced from the strength of the hand that plays the strings.

Legato—playing music so that the tones are played smoothly and connected. In stringed instruments, this is technically done by statically pressing with a first finger on one tone and then, another finger pressing after the first finger on another tone.

Melody—is a linear succession of musical tones that the listener perceives as a single entity.

Harmony—a simultaneous combination of two or more tones, which are played in addition to the melody.

Octave—an interval between one musical pitch and another with half or double its frequency. This interval is equivalent to six tones or twelve semitones.

Chromatic scale—is a musical scale with intervals of semitones. The chromatic scale includes all the western tones (twelve tones).

The term "player" is generally referred to the person playing the instrument, like a student or musician. It may at times refer to teachers or caregivers, operating or adjusting the device.

The term "Key" or "Keys", refers to the switches and triggers that the player presses to play the instrument. Like in the term "Piano keys" or "keyboard".

The term "StrumStick" refers to a joystick with a joystick controller.

The term "tone mapping" refers to what tone should be sounded when different combinations of controllers are activated. For example, pressing Key #1 and Key #2 simultaneously produces a "C" chord.

The term "velocity" is a measure of how rapidly and forcefully a key on a keypad is pressed when the player initially presses the key. Velocity measurement is intended to simulate the behavior of a piano mechanism; a tone struck on a piano is louder if the key is struck more forcefully.

An input device for operating a musical instrument having musical behavior of string instruments, which comprises:
  a) a key plate unit containing a set of input keys to be pressed by a player, in order to generate a first set of electric input signals, which emulate a combination of pressed keys of a musical instrument or a combination of pressed strings;
  b) a stick unit with variable tension of displacement comprising:
    b.1) a stick to be moved by the player between predetermined discrete positions, which emulate a combination of strummed strings of a musical instrument;
    b.1) a set of electric contacts, each corresponding to a different discrete position, for transmitting stick position signals;
  c) a processing unit comprising:
    c.1) input buttons for setting musical parameters (such as tone duration, flat musical scale selection, harmonic/melodic playing mode);
    c.2) a first set of interface inputs for receiving the stick position signals;
    c.3) a second set of interface inputs for receiving the first set of electric input signals;
    c.4) a memory for storing processing software;
    c.5) at least one processor, connected to the memory, for jointly processing the stick position signals and the first set of electric input signals using the processing software, and for outputting electric output signals representing codes of musical notes that corresponds to movements of the input keys between pressed and released positions, and movements of the stick between the discrete positions;
  d) one or more interface connections, for transmitting electric output signals representing codes of musical notes, from the processing unit to a computerized tone generating unit (such as a synthesizer, a computer, a smartphone, an internal sound generator or a tablet) that converts the electric output signals to sounds.

The input device may further comprise a set of movement sensors, attached to at least a part of the input keys and/or to the stick, for sensing data representing movement parameters of the keys or the stick (such as displacement velocity, the force applied on any key or on the joystick) and providing the data to the processing unit.

In one embodiment, the processing unit is adapted to:
  a) jointly process, using the processing software, the stick position signals, the first set of electric input signals and the movement parameters; and
  b) output electric output signals representing codes of musical notes that corresponds to a specific player using characteristic movements of the input keys between pressed and released positions, and characteristic movements of the stick between the discrete positions.

The signals may be transmitted using wired or wireless transmission.

The input device may further comprise electric sockets to receive cables or wires, to be connected to the tone generating unit, for transmitting the generated signals and a short-range wireless connection to the tone generating unit, for transmitting the generated signals.

Some of the sockets/connectors may also enable the connection of additional external input devices (such as head switches, foot switches, big button switches, eye tracking sensors and proximity sensors) to the processing unit.

In one aspect, all the parts are attached to each other, to form a single body assembly. Also, the input device may be implemented as a single unified body.

Each part may be adapted to be rotated and the tilt angle of each part can be changed according to the necessities of the player.

The input device may be a modular component, in which each part can be disconnected from the other parts, and still communicate with them through wired or wireless communication means.

The orientation of the key plate unit and the stick unit may be adjusted by rotating or tilting the key plate unit and the stick unit with respect to the processing unit.

The plate unit and the stick unit may be directly attached to each other to form a unified body, while the processing unit is remote.

The variable tension stick unit may comprise:
  a) a string board with several spaced semi-tubular grooves, each formed in a different angle, which corresponds to a discrete possible position of a stick;
  b) a stick consisting of a replaceable modular handle that rotates a pivotal rod around a fixed pivot, responsive to the movement and force applied by a player; and
  c) a stopper that restrict the movement of the pivotal in a discrete position when aligned with one of the tubular grooves.

The stopper may comprise:
  a) a tubular body to which a ball is inserted, along with a spring that pushes a push pin with its distal end and a fixation holder that is permanently mounted inside the tubular body to its internal cylindrical wall;
  b) a spring adjustor being a screw which is inserted into a corresponding thread formed in the fixation holder;
  c) a tubular flange for pushing the proximal end of the spring;
  d) a push pin for pushing the ball the against string board in a force that is determined by the spring adjustor;
  e) an array of proximity sensors for providing an electrical signal to the processing unit to generate a visual indication regarding the current discrete position of the stick, Whenever the player pushes the handle, tubular body rotates and causes the ball to travel in an arcuate path on the grooved surface of the string board, such that whenever the center the ball coincides with the center of a groove in the string board, the ball is pushed into a groove, in order to resist the rotation at that position.

In one aspect, the two side margin grooves in the string board correspond to two inactive positions, for allowing the player to be outside the strumming sequence whenever the stick exceeds the last position in each direction.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8A shows another example of layout of the input device, in which the processing unit has eight input buttons for settings;

FIG. 8B shows the rear side of the layout of FIG. 8A;

FIG. 8C shows another example with an ergonomic design of the keys;

DETAILED DESCRIPTION OF THE EMBODIMENTS OF THE INVENTION

The present invention is related to an input device for operating a musical instrument. The input device is adapted to be used by players with physical and motoric disabilities. The musical instrument has a musical behavior of string instruments, and it can be adapted to the musical behavior of any musical instrument such as percussion instruments, brass instruments etc.

The input device proposed by the present invention can be adjusted (manually or automatically) to create a wide tonal range musical instrument (2.5 Octaves) that can be taught, learned and played by players with disabilities that are unable to play common music instruments, such as piano or guitar. The input device can be used despite the physical limitations of the player and without giving up the musical expression ability of the instrument, which emulates standard string input device (e.g., from guitar to violin).

Figure 1:
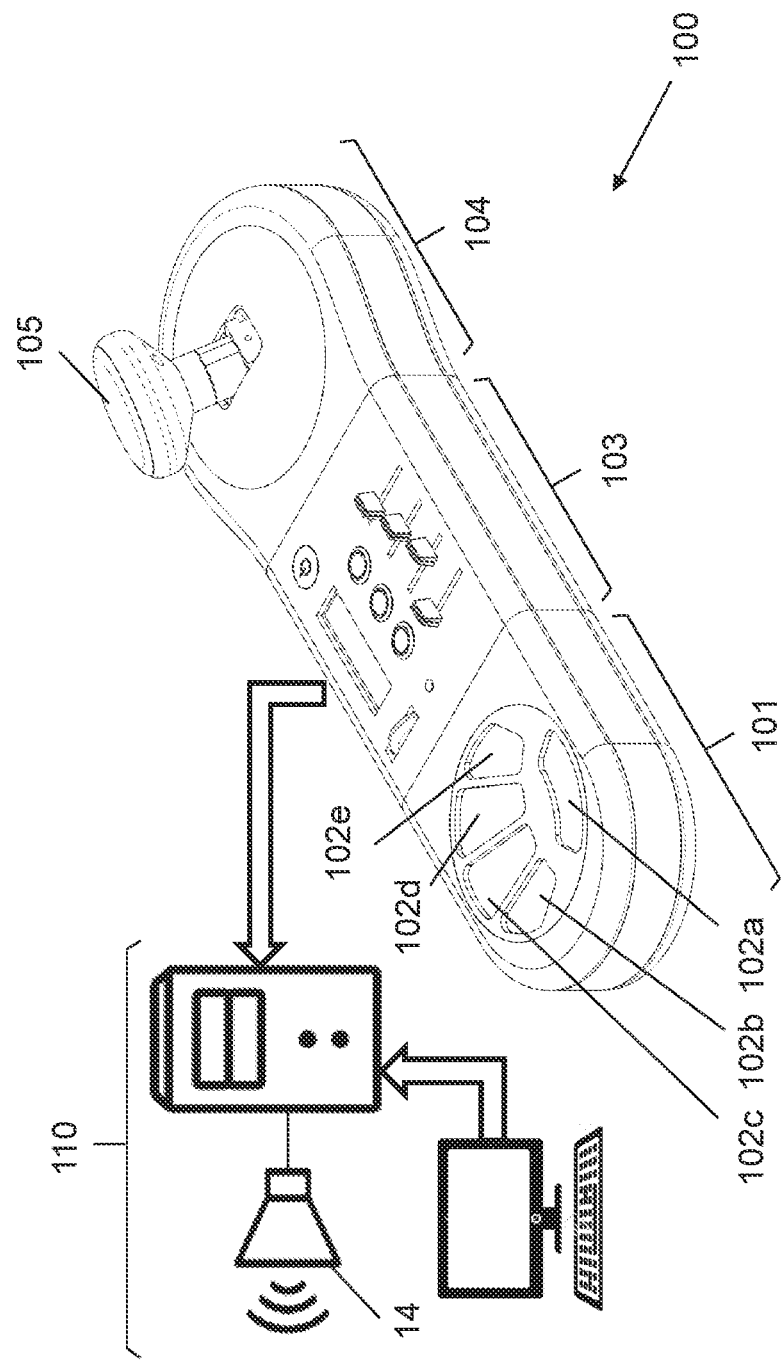
FIG. 1 shows an example of the proposed input device a modular instrument, according to an embodiment of the invention.

In one embodiment, as can be seen in FIG. 1, the input device 100 is a modular instrument, which comprises three main parts:

a. a key plate unit 101, containing a set of input keys 102a-102e;

b. a processing unit 103; and c. a joystick unit 104 with variable tension of displacement of the joystick 105.

The input keys 102a-102e of the key plate unit 101 are presses by fingers of one hand of the player, in order to receive inputs, which emulate a combination of pressed keys of a musical instrument (such as keys of a piano) or a combination of pressed strings. The joystick 105 is displaced by the other hand of the player, in order to receive inputs, which emulate strumming or pressing a combination of keys of a musical instrument (such as keys of a piano). The processing unit 103 comprises input buttons which are used for settings, such as tone duration, flat musical scale selection, harmonic/melodic playing mode, etc.

The processing unit 103 receives inputs signals from each input device, processes the received signals and generates electric signals which reflect activation attributes of the player (such as displacement velocity and applied force on each key and on the joystick 105). These signals are transmitted (using wired or wireless transmission) to a tone generating unit 110, such as a synthesizer or a computer or smartphones/tablets with appropriate software. The tone generating unit 110 converts the received signals to composite signals which feed a loudspeaker 111, in order to generate sound signals.

Figure 2:
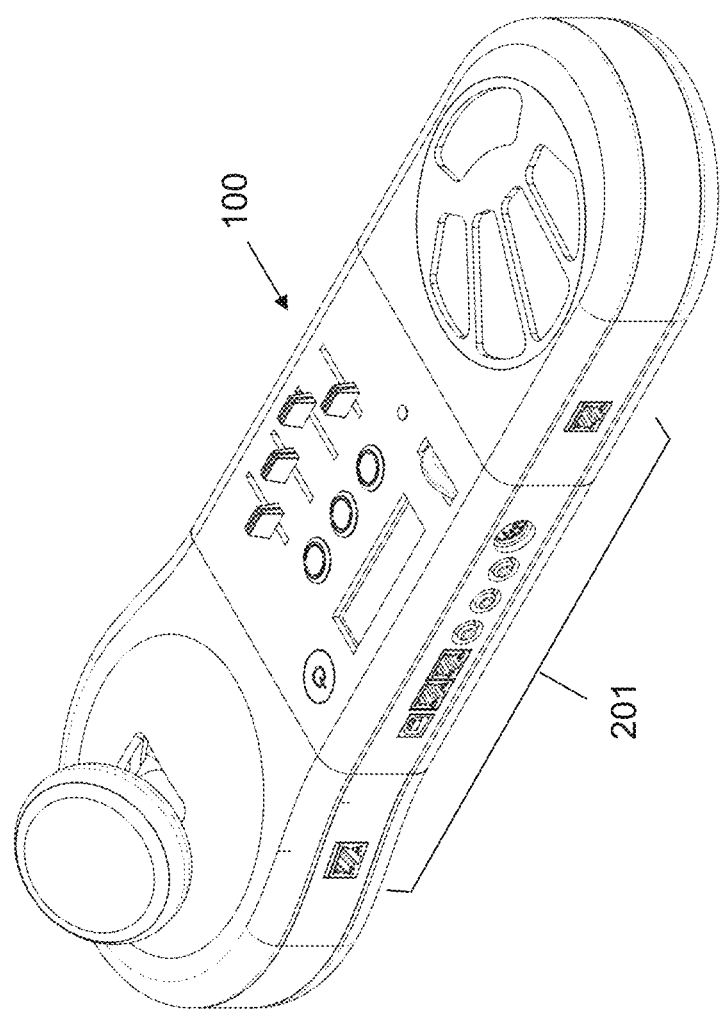
FIG. 2 shows the rear side of the input device, which contains electric sockets to receive cables or wires.

FIG. 2 shows the rear side of the input device 100, which contains electric sockets 201 to receive cables or wires, to be connected to the tone generating unit 110, in order to transmit the generated signals. Alternatively, the generated signals may be transmitted to the tone generating unit 110 via a short-range wireless connection. Some of these sockets/connectors also enable connection of additional external input devices to the brain, such as head switches, foot switches, big button switches, eye tracking sensors, proximity sensors.

In the input device 100, all the parts are typically attached to each other, to form a single body assembly. However, each part can be adapted to be rotated and the tilt angle of each part can be changed according to the necessities of the player, as shown in FIGS. 3B-3C below.

In another embodiment, the input device 100 is a modular instrument and each part can be disconnected from the other parts, and still communicate with them through wired or wireless communication means, as shown in 173A and 4B.

Figure 3A:
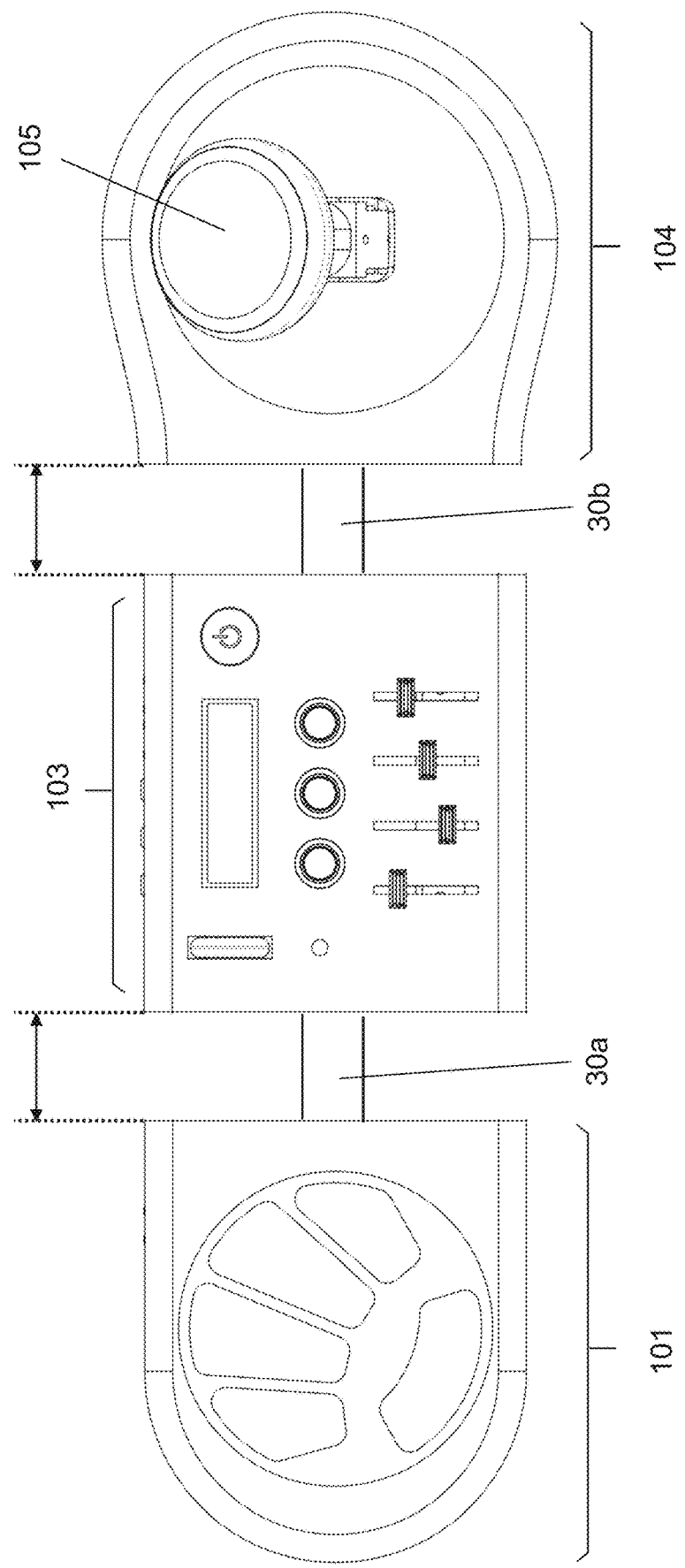
FIG. 3A shows an arrangement where the total length of the input device is adjustable.

FIG. 3A shows an arrangement where the total length of the input device 100 is adjusted by displacing units 101 and 104 from unit 103, while still maintaining electrical and mechanical connection via movable contact assemblies 30a and 30b.

Figure 3B:
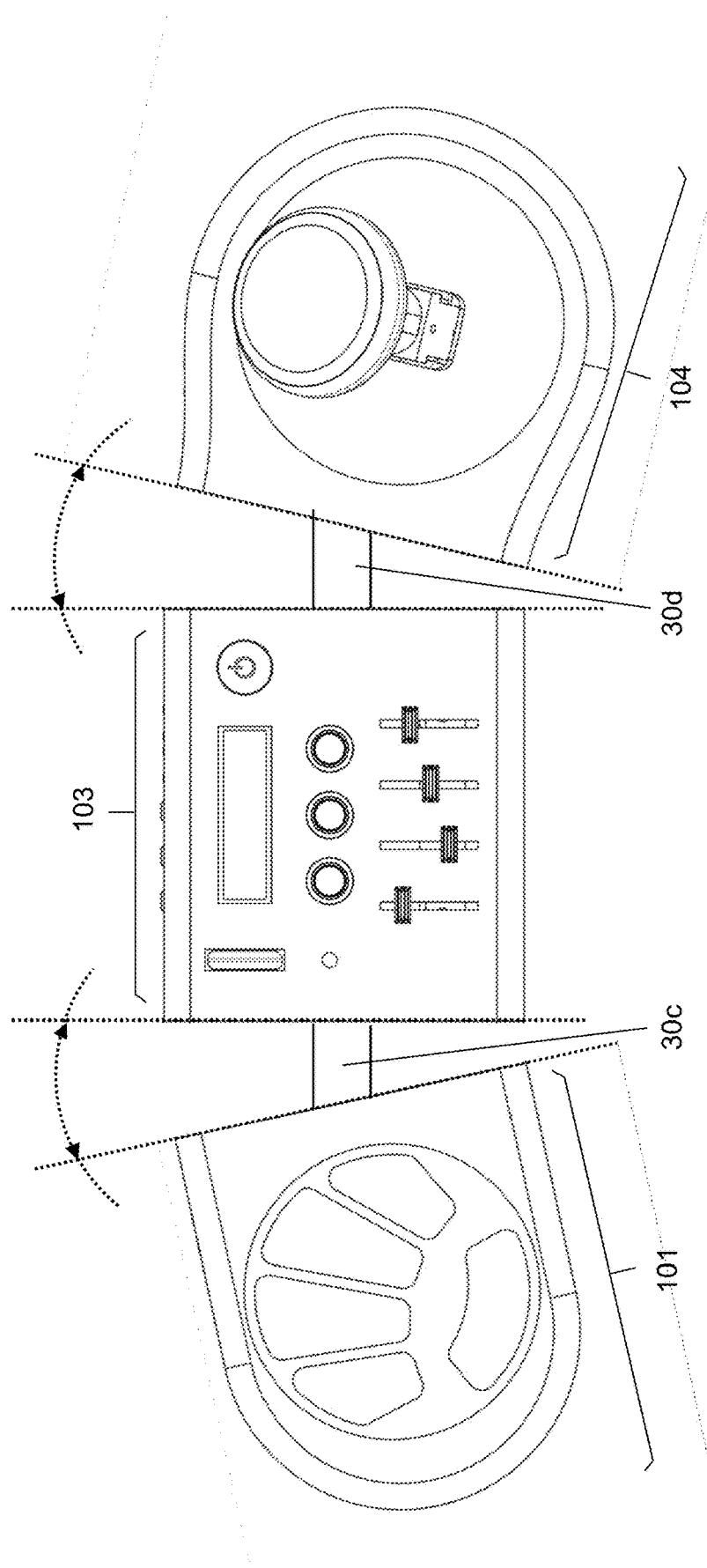
FIG. 3B shows an arrangement where the orientation of the input device is adjusted by angular rotation on a horizontal plane.
Figure 3C:
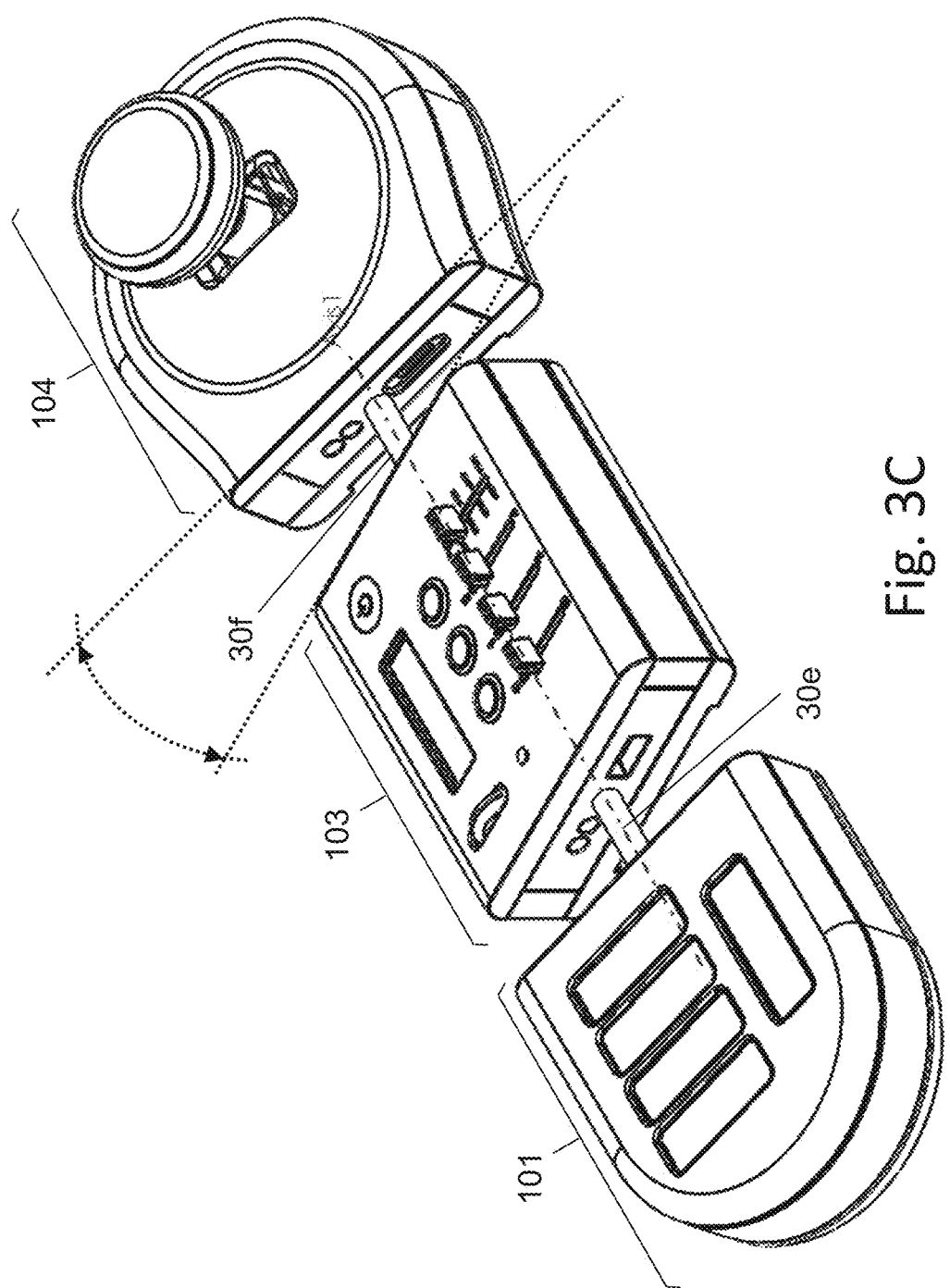
FIG. 3C shows an arrangement where the orientation of the input device is adjusted by tilting.

FIG. 3B shows an arrangement where the orientation of the input device 100 is adjusted by rotating units 101 and 104 with respect to unit 103, while still maintaining electrical and mechanical connection via movable contact assemblies 30c and 30d. Angular horizontal rotation adjustment allows to align direction of stick movement and keys alignment to hand posture and movement.

FIG. 3C shows an arrangement where the orientation of the input device 100 is adjusted by tilting units 101 and 104 with respect to unit 103, while still maintaining electrical and mechanical connection via movable contact assemblies 30e and 30f.

Figure 3D:
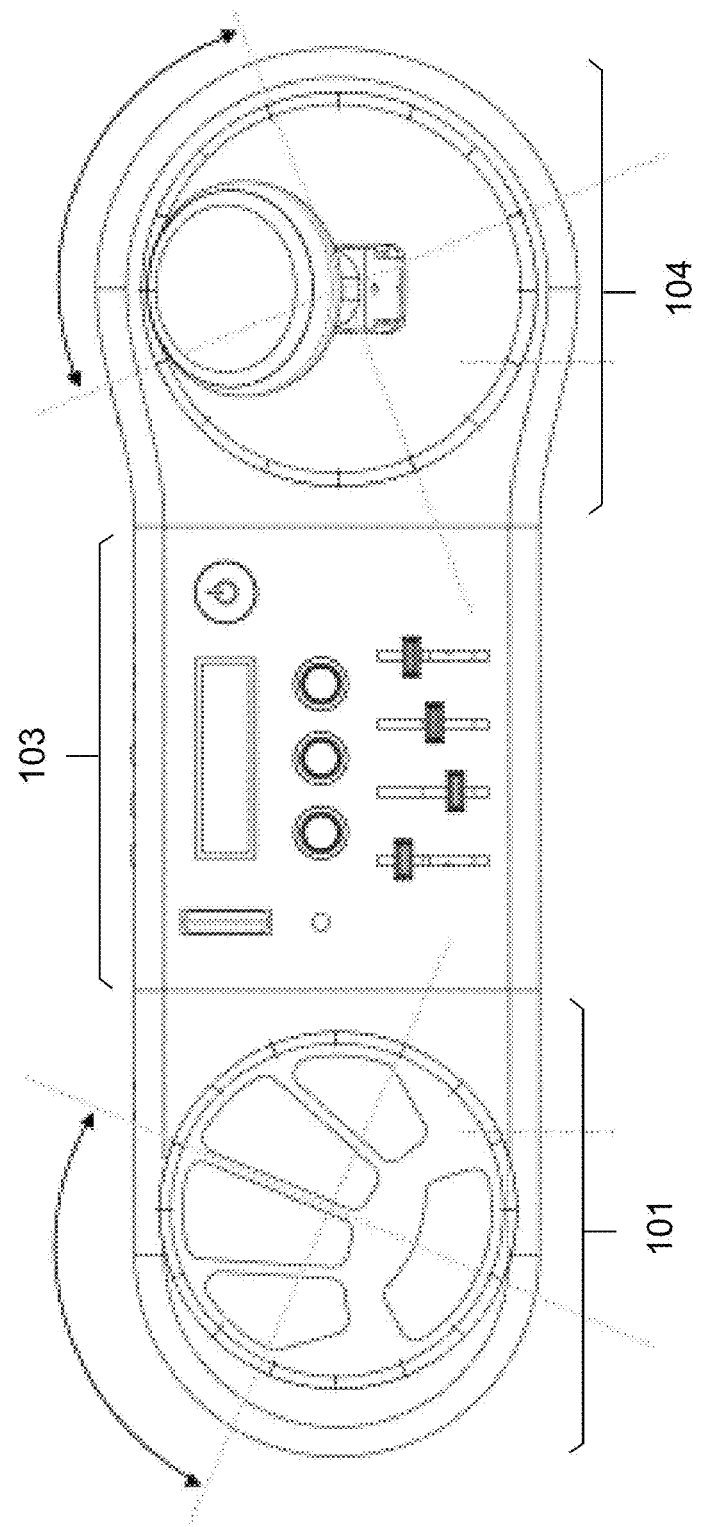
FIG. 3D shows an arrangement where the plate of keys or joystick units comprises an angular rotation mechanism for rotating them clockwise or counterclockwise around its vertical central axis.

In an embodiment, the plate of keys unit 101 and/or unit 104 comprises an adjustable angular rotation mechanism for rotating them clockwise or counterclockwise, enabling almost 360° rotation, in order to provide adjustment to left-hand and right-hand players and to provide optimal adaptation to the player's preferences or limitations, as can be seen in FIG. 3D.

Figure 4A:
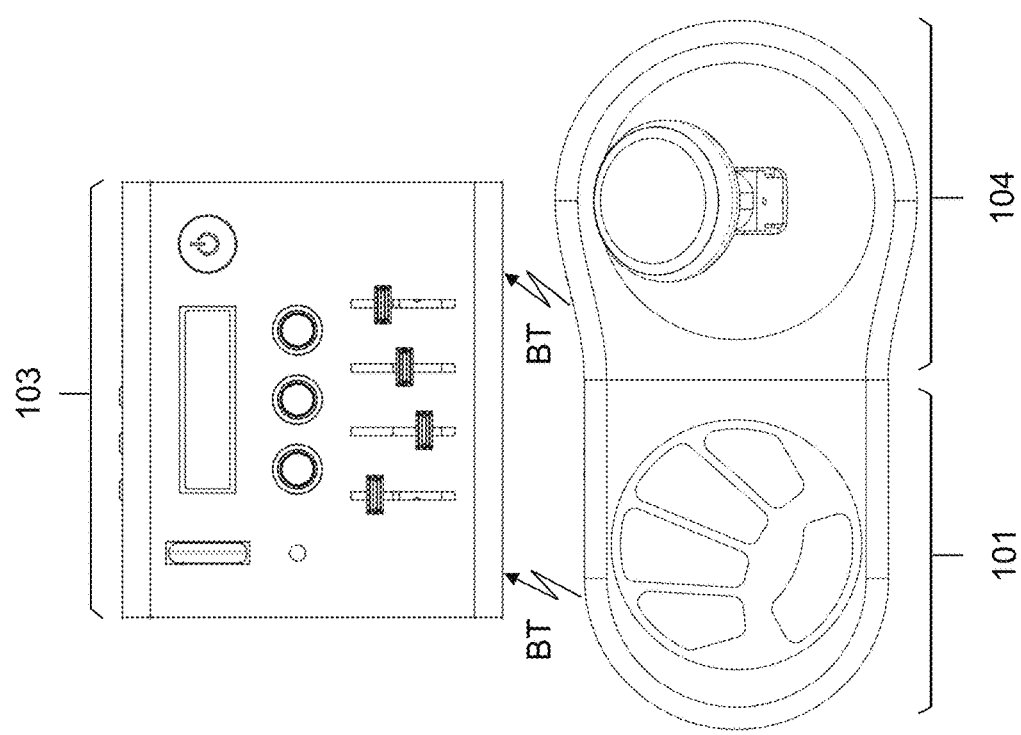
FIG. 4A shows an embodiment, in which input units are directly attached to each other to form a unified body.

FIG. 4A shows an embodiment, in which units 101 and 104 are directly attached to each other to form a unified body, while the processing unit 103 is remote. In this case, data from units 101 and 104 is transmitted to processing unit 103 via wireless communication (each of the unit may comprise a short-range transceiver, such as Bluetooth).

Figure 4B:
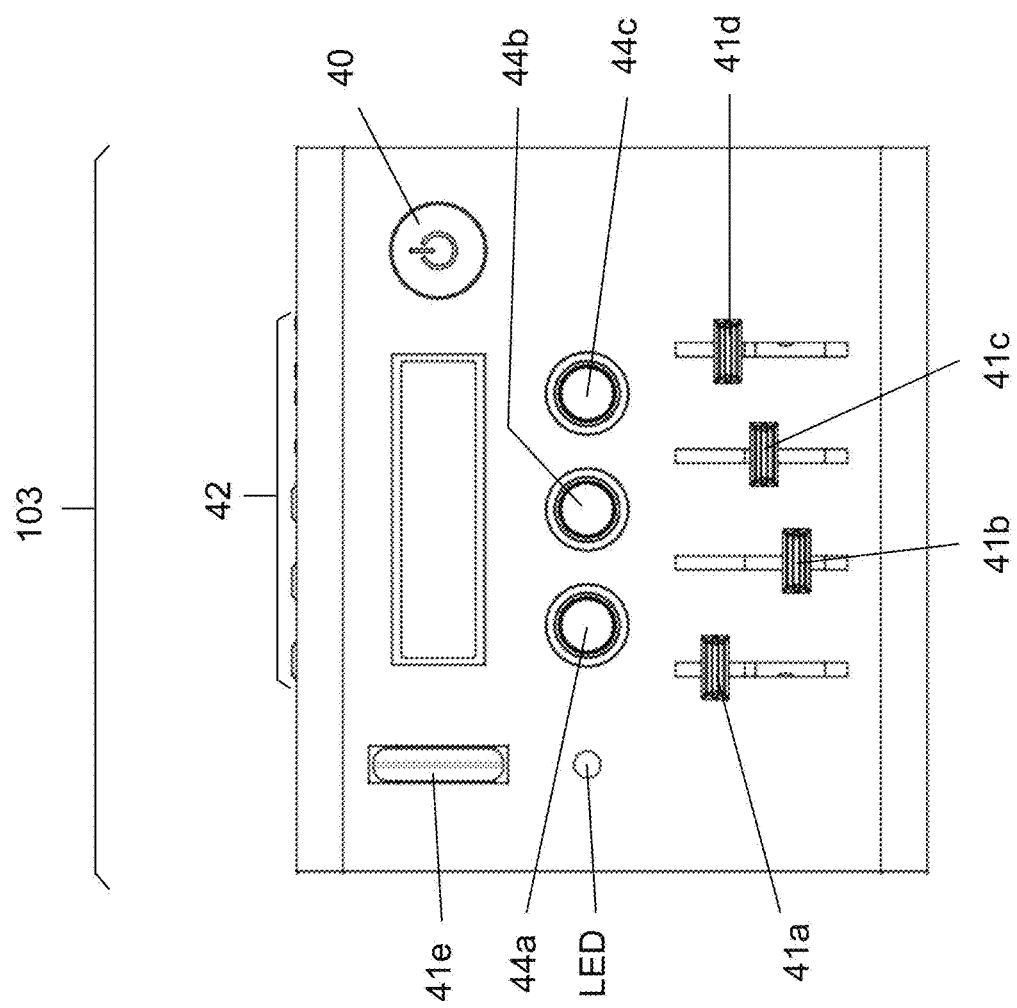
FIG. 4B shows an embodiment of the invention, where the processing unit comprises functional button and sliders.

FIG. 4B shows an embodiment of the invention, where the processing unit 103 comprises an on/off button, slide potentiometers 41a-41e, selector menu buttons 44a-44c, a display screen and other optional connections 42, such as USB connection, RJ45, RCA, DINS, etc.

Figure 5A:
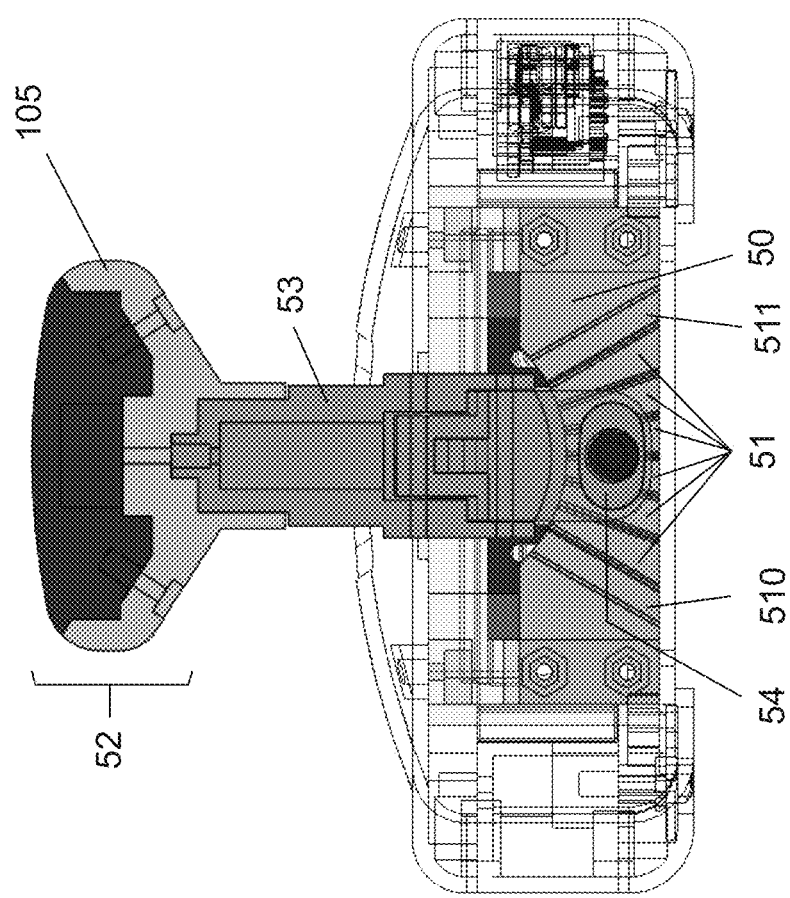
FIG. 5A illustrates the mechanism and principal operation of joystick unit with variable tension of displacement of the joystick, according to an embodiment of the invention.
Figure 19A:
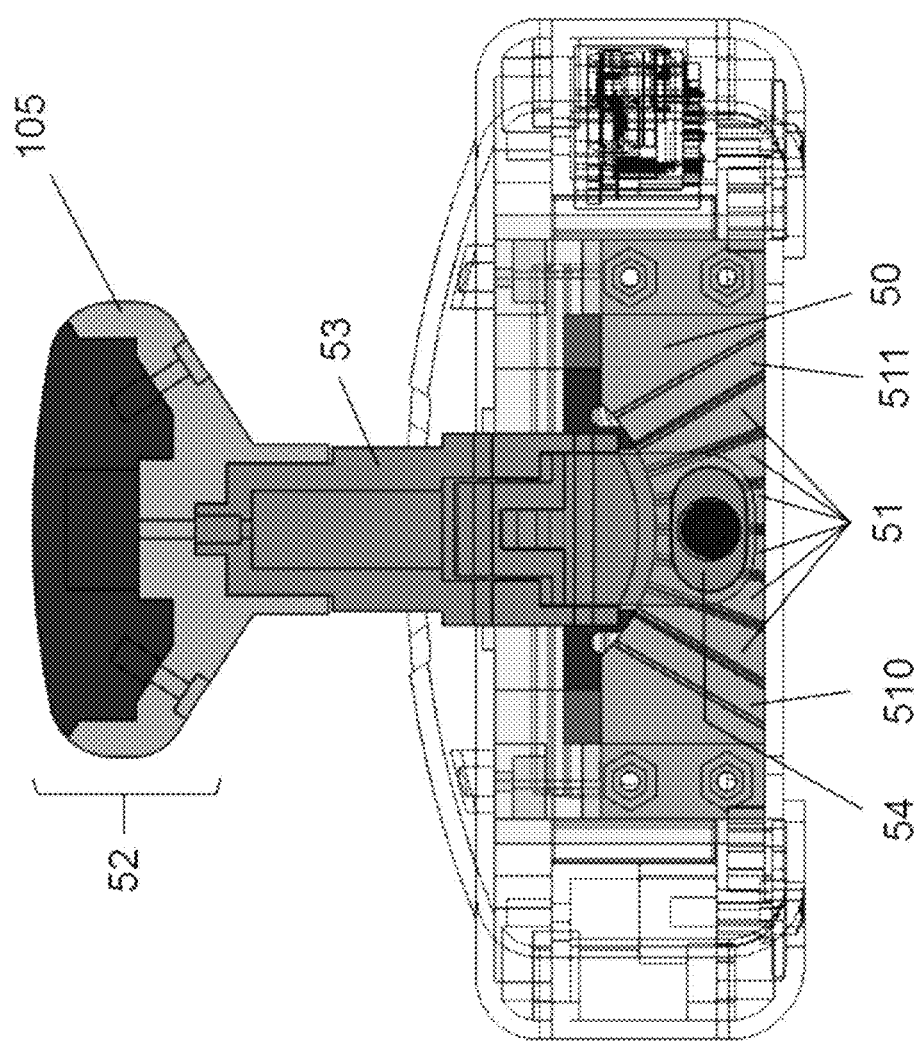
FIGS. 19A-19I, 20, and 21 are black and white representations of the depictions of FIGS. 5A-5I, 6, and 7, in accordance with various embodiments.

FIG. 5A illustrates the mechanism and principal operation of joystick unit 104 with variable tension of displacement of the joystick 105, according to an embodiment of the invention. FIG. 19A is a black and white representation of FIG. 5A. The joystick unit 104 comprises a string board 50 with several spaced semi-tubular grooves 51, each formed in a different angle, which corresponds to a discrete possible position of joystick 105. Joystick 105 consists of a replaceable modular handle 52 that rotates a pivotal rod 53 (which acts as a lever) around a fixed pivot, according to the movement and force applied by the player. Pivotal rod 53 includes a stopper 54 that restricts the movement of pivotal rod 53 in a discrete position when aligned with one of the tubular grooves 51. In order to move to another discrete possible position, the player should increase the rotational force applied, until the stopper 54 is pulled out from the current groove and passes to the next groove (thereby switching from one angle to another angle). This way, the player can move joystick 105 between different discrete positions, which correspond to different switching angle.

The two side margin grooves 510 and 511 correspond to two inactive positions, which allow the player to be outside the strumming sequence whenever the joystick 105 exceeds the last position in each direction.

The force applied by stopper 54 against string board 50 and each groove 51 can be adjusted manually, in order to provide a desired variable tension to the movement of joystick 105. The board is composed of plastics and/or elastomeric rubber materials in order to minimize and dampen the noise produced while strumming.

Figure 5C:
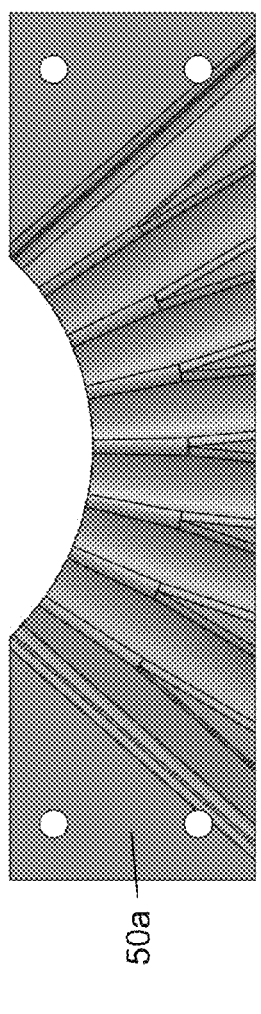
FIGS. 5C-5E illustrate three different string boards with different ranges and spacing between borders of adjacent grooves.
Figure 5D:
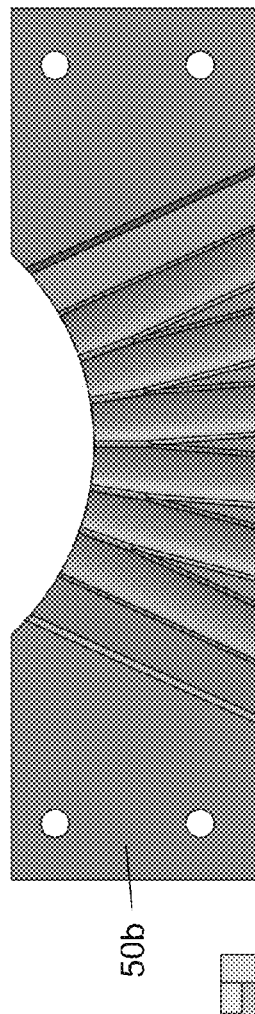
Figure 5E:
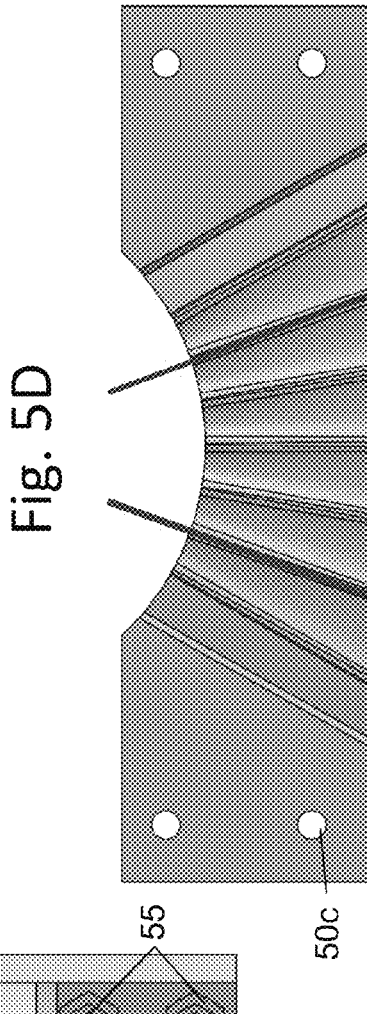
Figure 5B:
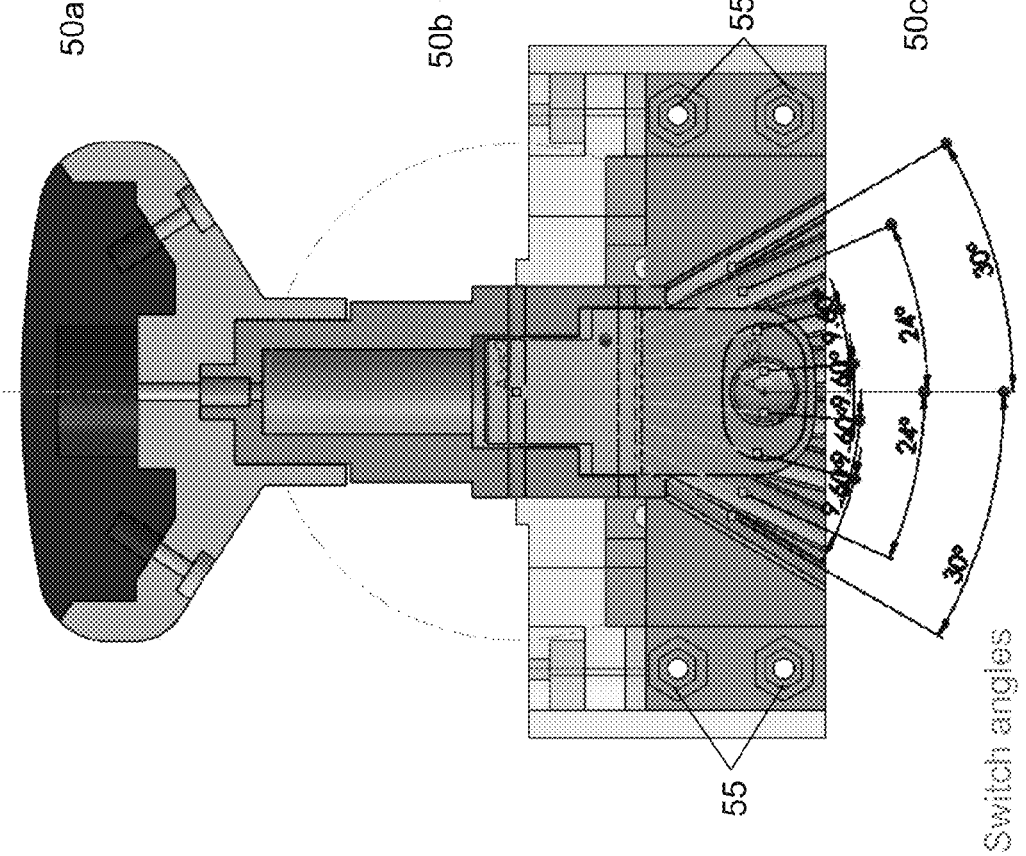
FIG. 5B illustrates possible angles that can be obtained.
Figure 19C:
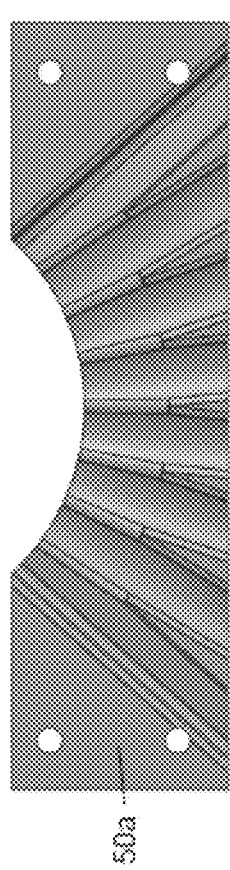
Figure 19D:
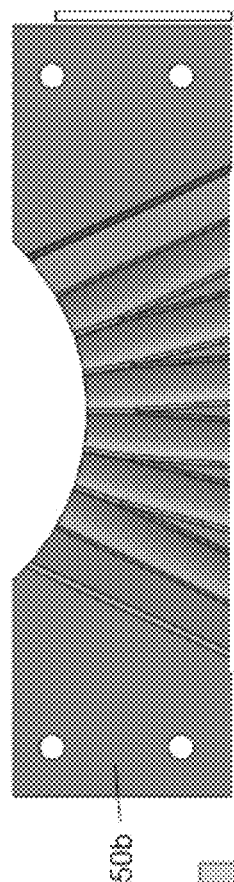
Figure 19E:
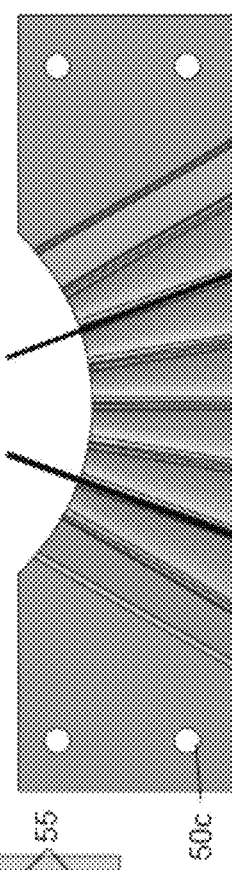
Figure 19B:
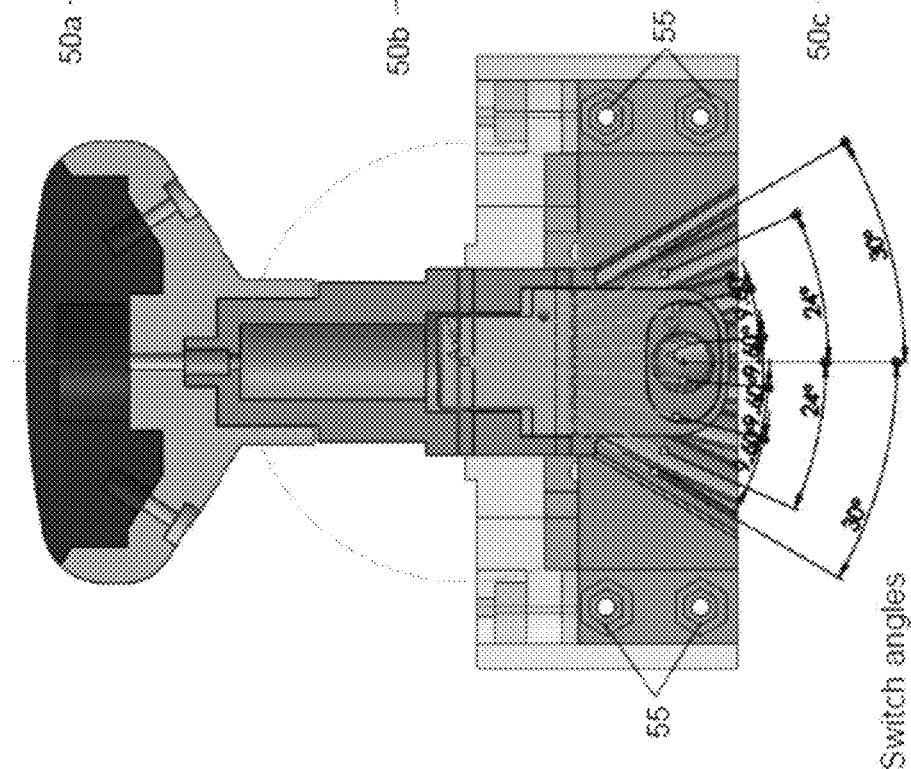

FIG. 5B illustrates possible angles that can be obtained. FIG. 19B is a black and white representation of FIG. 5B. The maximal range in this example is ±30°, with angular spacing of 9.6° between borders of adjacent grooves. FIG. 19B is a black and white representation of FIG. 5B.

FIGS. 5C-5E illustrate three different string boards 50a-50c with different ranges and spacing between borders of adjacent grooves. FIGS. 19C-19E are black and white representations of FIGS. 5C-5E. Each string board is mounted by four nuts 55, such that it is replicable. This feature allows to change the type of strings, while maintaining the same mechanism and thereby, possibly providing different tactile feedback.

Figure 5G:
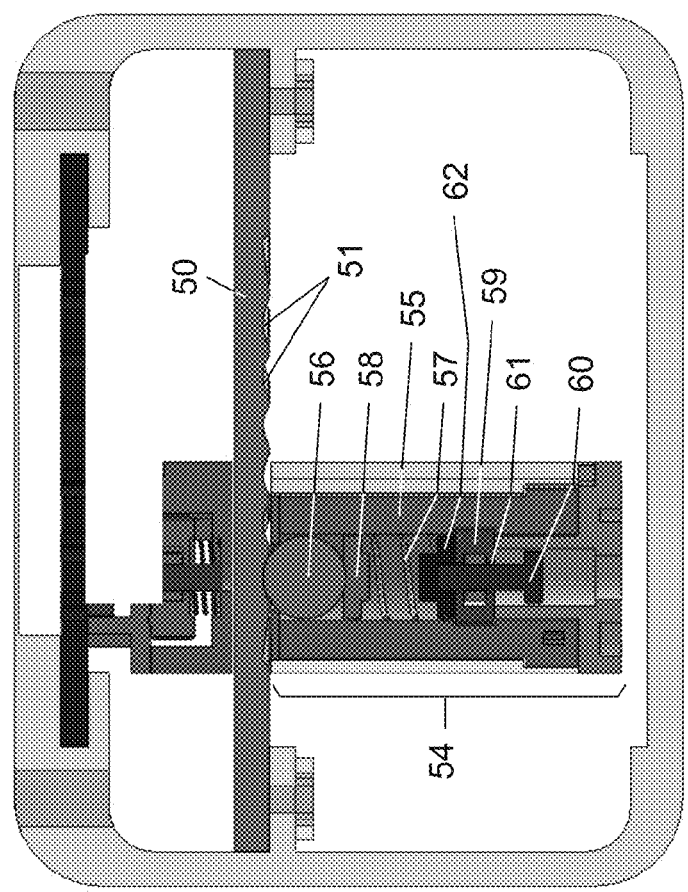
FIG. 5G illustrates a top cross-sectional view of the joystick unit, according to an embodiment of the invention.
Figure 5F:
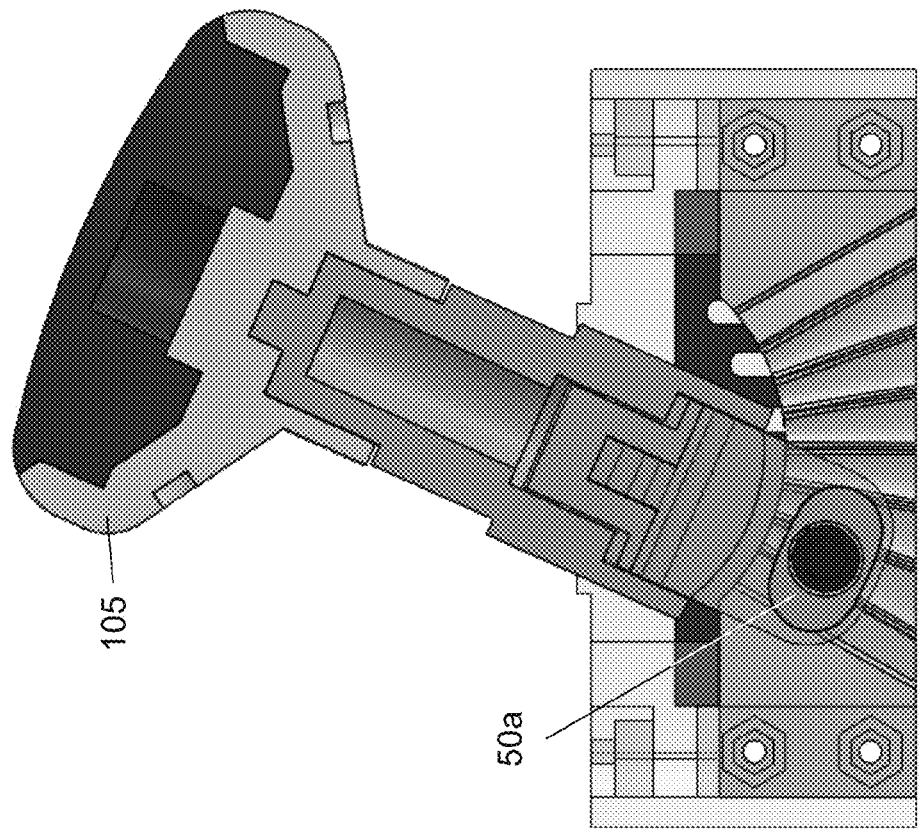
FIG. 5F illustrates an orientation of joystick, which is positioned close to the maximal angle.
Figure 19G:
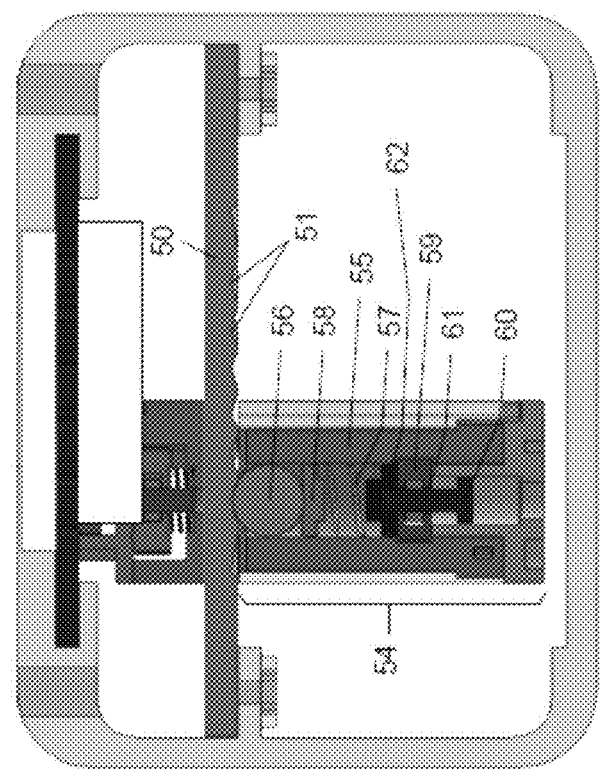
Figure 19F:
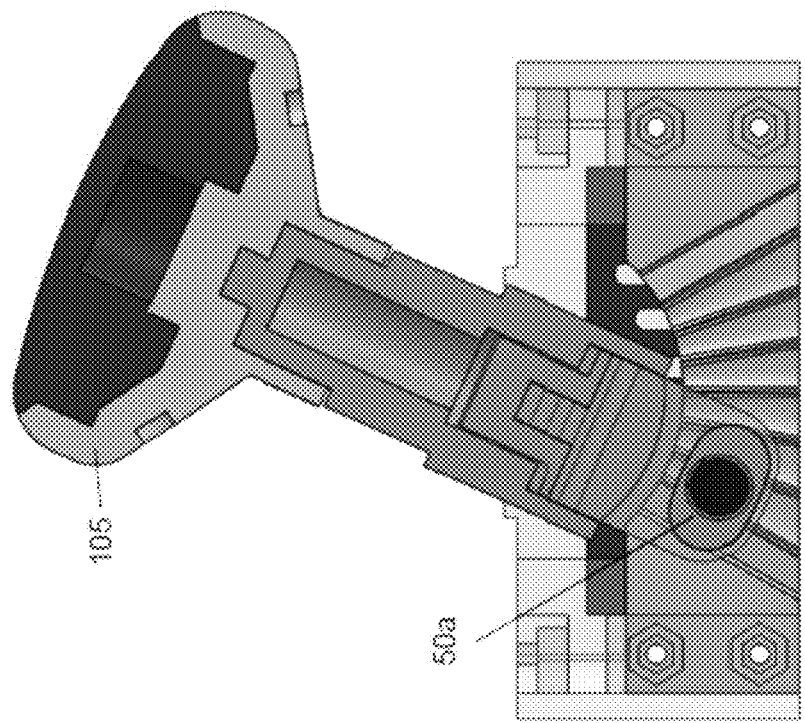

FIG. 5F illustrates an orientation of joystick 105, which is positioned close to the maximal angle. FIG. 19F is a black and white representation of FIG. 5F. Beyond this point, the joystick 105 has inactive margins, which allow to move in and out of the first and last strings, from a neutral position.

FIG. 5G illustrates a top cross-sectional view of the joystick unit 104, according to an embodiment of the invention. FIG. 19G is a black and white representation of FIG. 5G. Stopper 54 consists of a tubular body 55 to which a ball 56 is inserted, along with a spring 57 that pushes a push pin 58 with its distal end and a fixation holder 59 that is permanently mounted inside the tubular body 55, to its internal cylindrical wall. Spring adjustor 60 is a screw which is inserted into a corresponding thread 61 formed in fixation holder 59 and pushes the proximal end of spring 57 by a tubular flange 62. Push pin 58 pushes ball 56 against string board 50 in a force that is determined by spring tightener adjustor 60, which determines the level of contraction of spring 57. When the player pushes the handle 52, tubular body rotates and causes ball 56 to travel in an arcuate path on the grooved surface of string board 50. Whenever the center of ball 56 coincides with the center of a groove in the string board 50, ball 56 is pushed into this groove, in order to restrict/resist the rotation at that position. Since the surface of string board 50 is serrated, the player will have to increase the force he applies on handle 52 in order to draw ball 56 from the current groove and force it to continue traveling on the serrated surface of string board 50, until coinciding with the center of the next groove. This way, the movement of joystick 105 is divided to several discrete positions, which are tactile to the player.

Figure 5H:
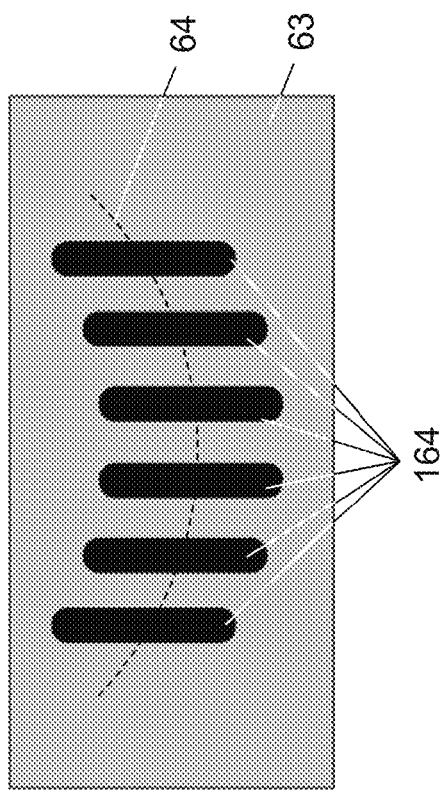
FIG. 5H illustrates a replaceable reed switch board to provide an electrical signal corresponding with the position of the joystick visual indication regarding the current discrete position of the joystick.
Figure 19H:
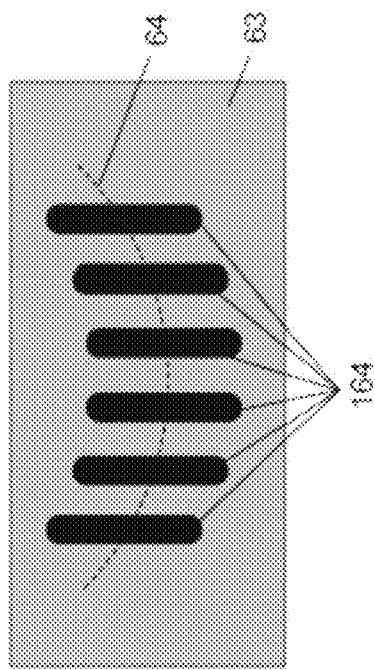

In order to provide an electrical signal to the processing unit 103 and visual indication regarding the current discrete position of joystick 105, joystick unit 104 comprises an array of proximity sensors such as, reed switches (a switch with two flexible tabs which are activated by a magnetic field, induced by a permanent magnet. When the magnetic field will be sufficiently close to the switch, the tabs will bend to be attached to each other, thereby forming a short circuit. When the magnetic field will be remote with respect to the switch, the tabs will be spaced from each other to form an open circuit), deployed on a (replaceable) reed switch board 63 (shown in FIG. 5H, with FIG. 19H being a black and white representation of FIG. 5H.) along an arc 64, which corresponds to the arcuate traveling path of stopper 54. Reed switch board 63 is a kind of position a sensor, which provides an electrical signal that corresponds to the position of the joystick 105. Of course, other position sensors may be used.

Also, the spacing between adjacent reed switches 64 on reed switch board 63 corresponds to the angular spacing between borders of adjacent grooves in string board 50. These reed switches are adapted to produce a signal to the processing unit 103 and turn a corresponding separate LED on, whenever is pushed to be in one of the possible discrete positions (i.e., when ball 56 enters into one of the semi-tubular grooves 51).

Figure 5I:
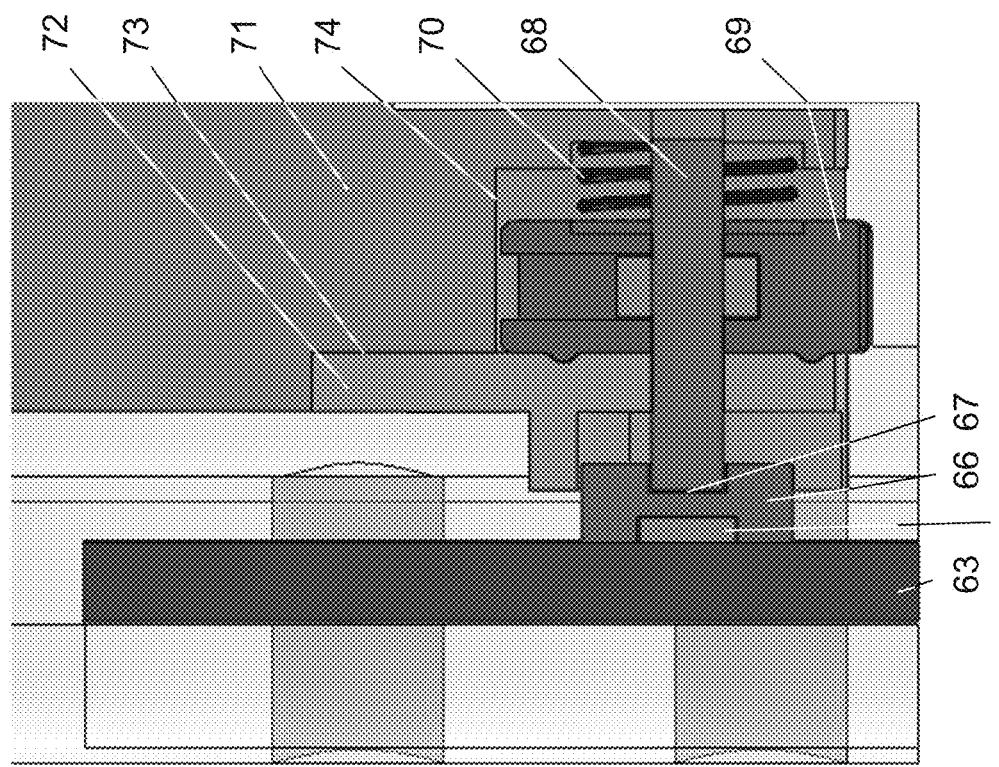
FIG. 5I illustrates the mechanism for controlling the array of reed switches, according to an embodiment of the invention.
Figure 19I:
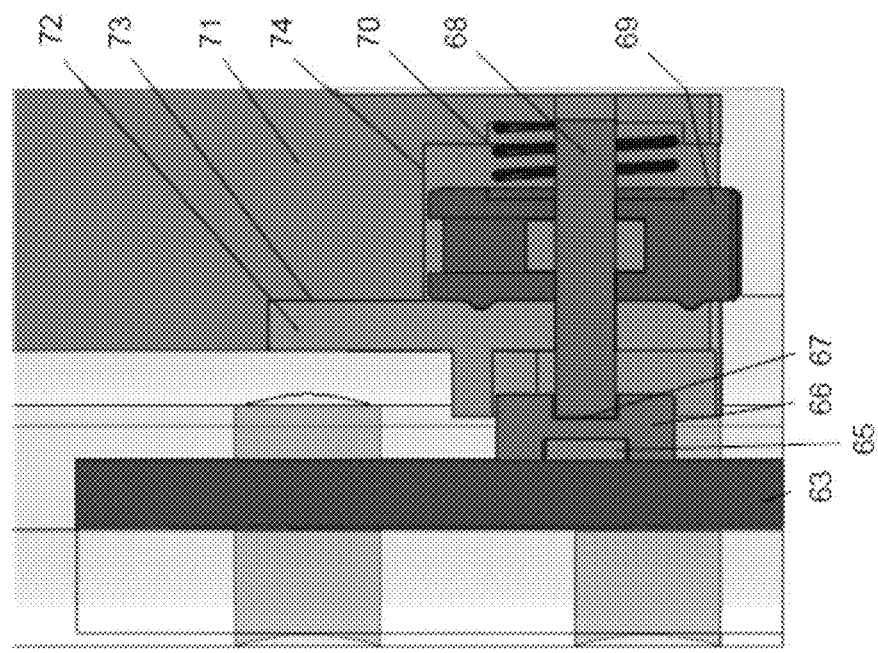

FIG. 5I illustrates the mechanism for controlling the array of reed switches, according to an embodiment of the invention. FIG. 19I is a black and white representation of FIG. 5I. Handle 52 of Joystick 105 rotates a pivotal lever 71 that is located behind string board 50 and rotates around the above fixed pivot, according to the movement and force applied by the player, in parallel to the rotation of pivotal rod 53. Reed switch board 63 is mounted vertically behind string board 50. A permanent magnet 65 is held by a magnet holder 66 with a recession 67, into which a rod 68 is inserted. A width adjustment member 69 is threaded over rod 68, followed by a spring 69. A cover 72 is inserted into a recession 73 in pivotal lever 71 and is also threaded over rod 68. Both the distance adjustment member 69 and spring 70 are inserted into a recession 74 in pivotal lever 71, such that the level of contraction of spring 70 is adjusted by the (adjustable) distance adjustment member 69. This way, magnet 65 is adjusted relatively to the reed switch board 63 with a to achieve a desired distance between the magnet and the reed switch. When Joystick 105 is pushed to be in one of the possible discrete positions, magnet 65 will exactly coincide with the corresponding reed switch 64. As a result, this particular reed switch will produce an electric signal to the processing unit 103 and turn on a corresponding LED. When Joystick 105 is pushed to be in another possible discrete position, magnet 65 will exactly coincide with another corresponding reed switch 64. As a result, this reed switch will produce another discreet electric signal to the processing unit 103 and turn on another corresponding LED.

Figure 6:
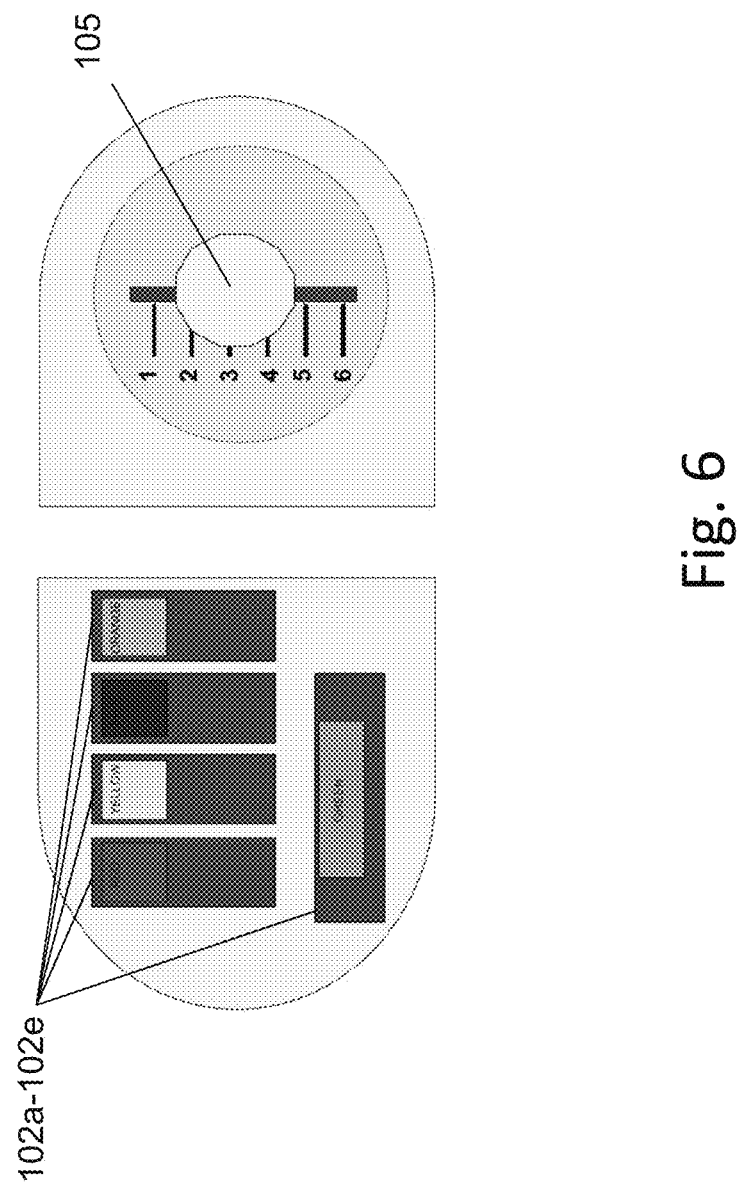
FIG. 6 shows an example of a combination of activating input keys while strumming, according to an embodiment of the invention.
Figure 20:
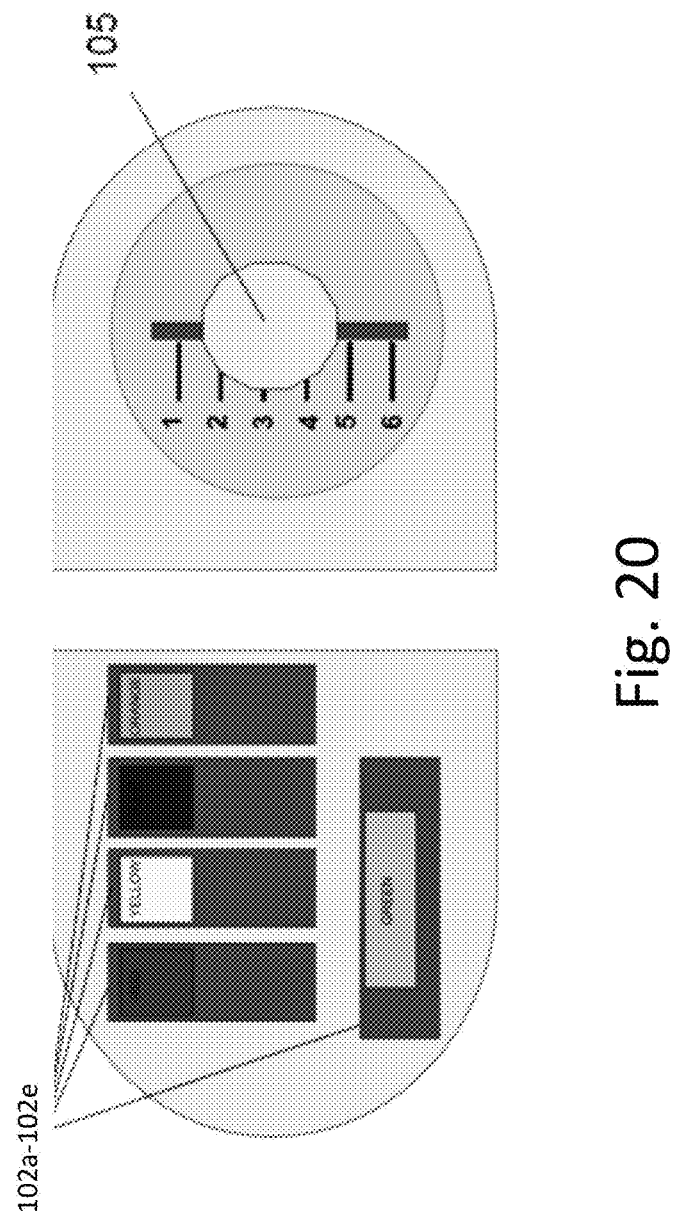

FIG. 6 shows an example of a combination of activating input keys while strumming, according to an embodiment of the invention. FIG. 20 is a black and white representation of FIG. 6. In this example, any combination of input keys 102 (that may have different colors) represent keys of a musical instrument (e.g., a piano), while strumming is obtained by moving Joystick 105 between the 6 possible discrete positions (1, . . . , 6).

Figure 7:
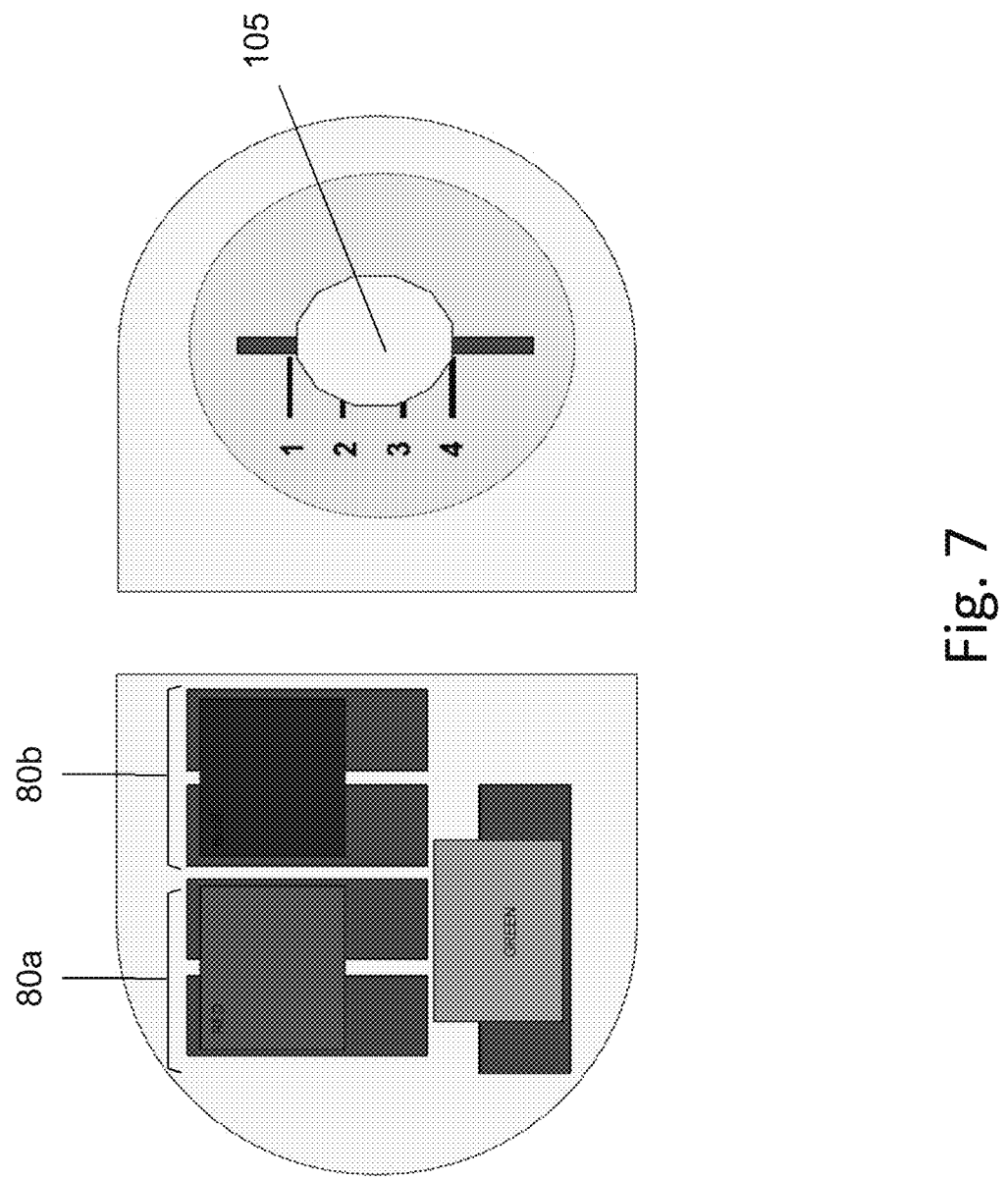
FIG. 7 shows another example of a combination of activating two pairs of input keys and, along with strumming, according to an embodiment of the invention.
Figure 21:
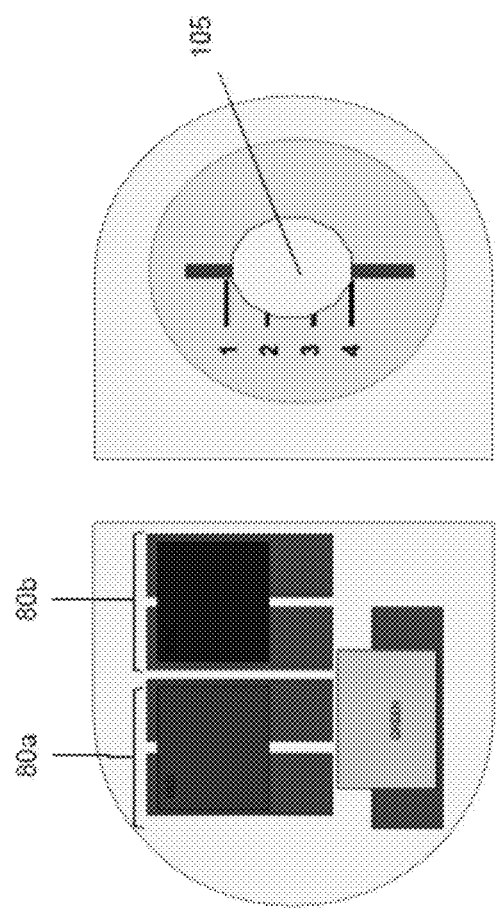

FIG. 7 shows another example of a combination of activating two pairs of input keys 80a and 80b, thereby allowing a larger more accessible key area, along with strumming, according to an embodiment of the invention. FIG. 21 is a black and white representation of FIG. 7. This combination will provide different chords along with strumming between discrete positions 1-6.

FIG. 8A shows another example of layout of the input device 100, in which the processing unit 103 has eight input buttons 81a-81h for settings, such as tone duration, musical scale selection, harmonic/melodic playing mode, etc.

Each input button is marked with a corresponding symbol to obtained a predetermined effect, when pressed by the player.

FIG. 8B shows the rear side of the layout of FIG. 8A. In this case, an HDMI cable is connected to HDMI socket 82 in order to transmit the generated signals to the tone generating unit 110. In this configuration, the MIDI unit is internal and transmits wirelessly to the tone generating unit 110. The HDMI provides access of additional input switches/devices to the processing unit 103, thereby enabling a wide range of adjustments to players.

FIG. 8C shows another example with an ergonomic design of the keys 102a-102e.

Figure 9:
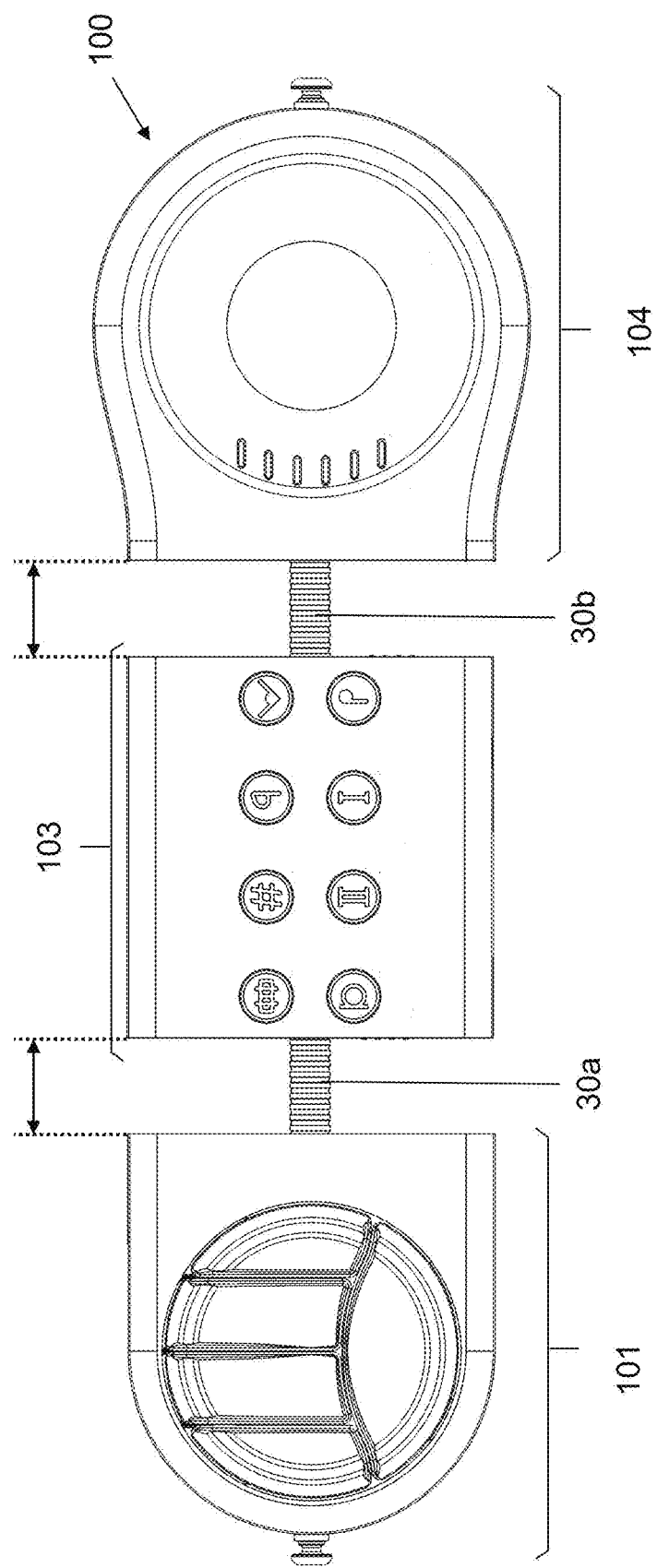
FIG. 9 shows an arrangement of the ergonomic design, where the total length of the input device is adjusted.

FIG. 9 shows an arrangement of the ergonomic design, where the total length of the input device 100 is adjusted by displacing units 101 and 104 from unit 103, while still maintaining electrical and mechanical connection via movable contact assemblies 30a and 30b.

Figure 10:
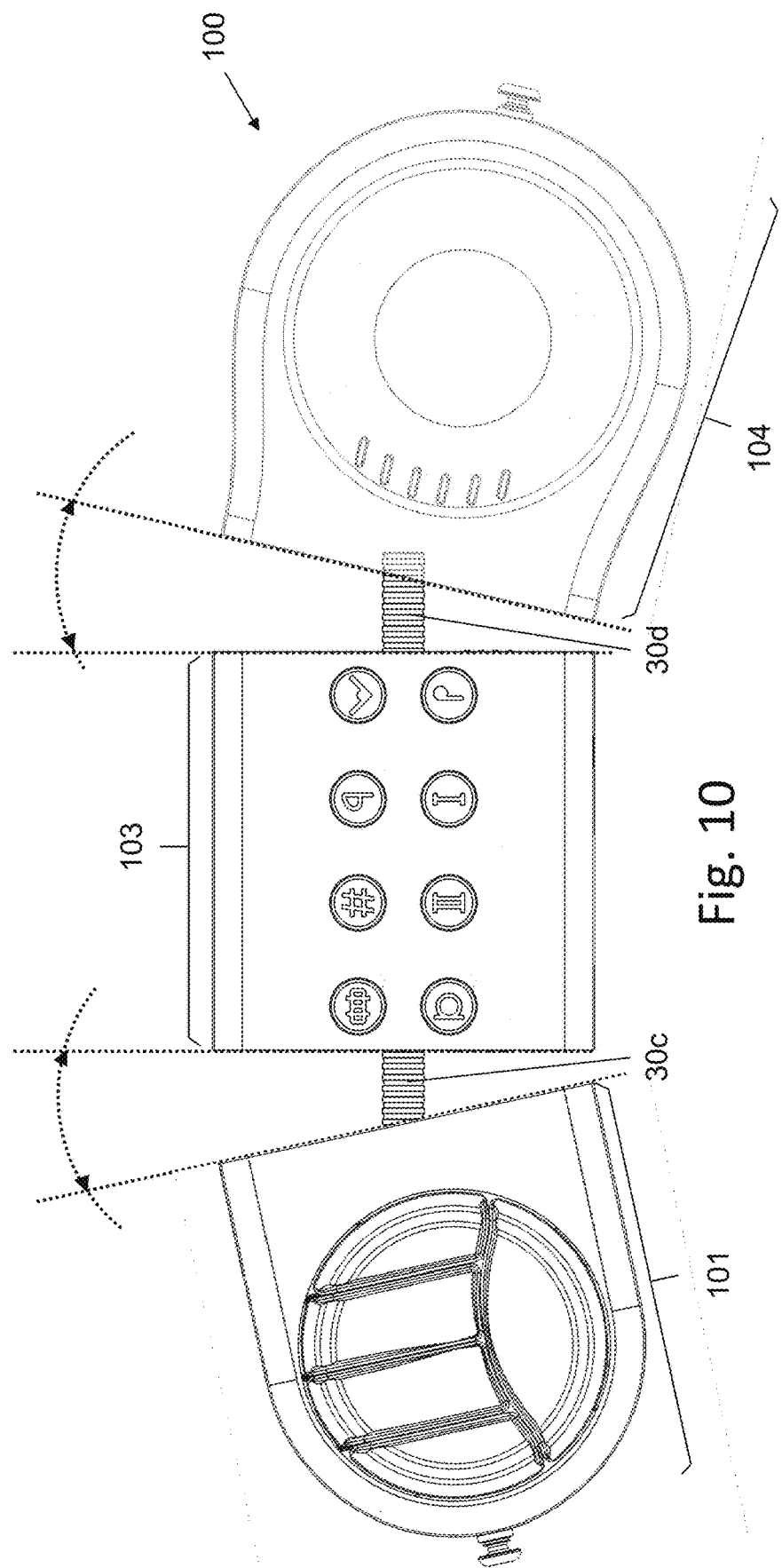
FIG. 10 shows an arrangement of the ergonomic design, where the orientation of the input device is adjusted by angular rotation on a horizontal plane.

FIG. 10 shows an arrangement of the ergonomic design, where the orientation of the input device 100 is adjusted by rotating units 101 and 104 with respect to unit 103, while still maintaining electrical and mechanical connection via movable contact assemblies 30c and 30d. Angular rotation adjustment in a horizontal plane allows to align direction of keys & stick movement to hand movement.

Figure 11:
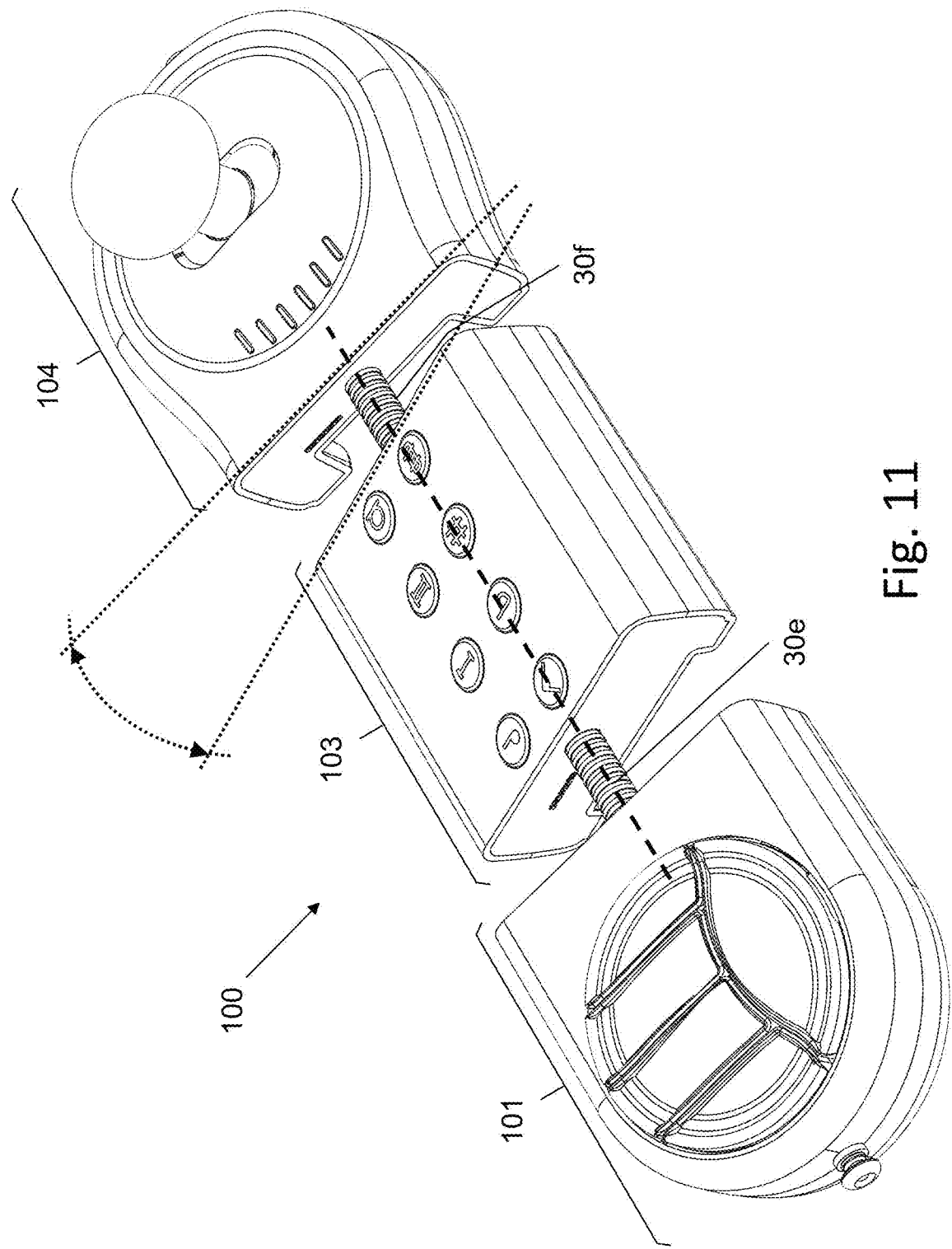
FIG. 11 shows an arrangement where the orientation of the input device is adjusted by tilting units.

FIG. 11 shows an arrangement where the orientation of the input device 100 is adjusted by tilting units 101 and 104 with respect to unit 103, while still maintaining electrical and mechanical connection via movable contact assemblies 30e and 30f.

Figure 12:
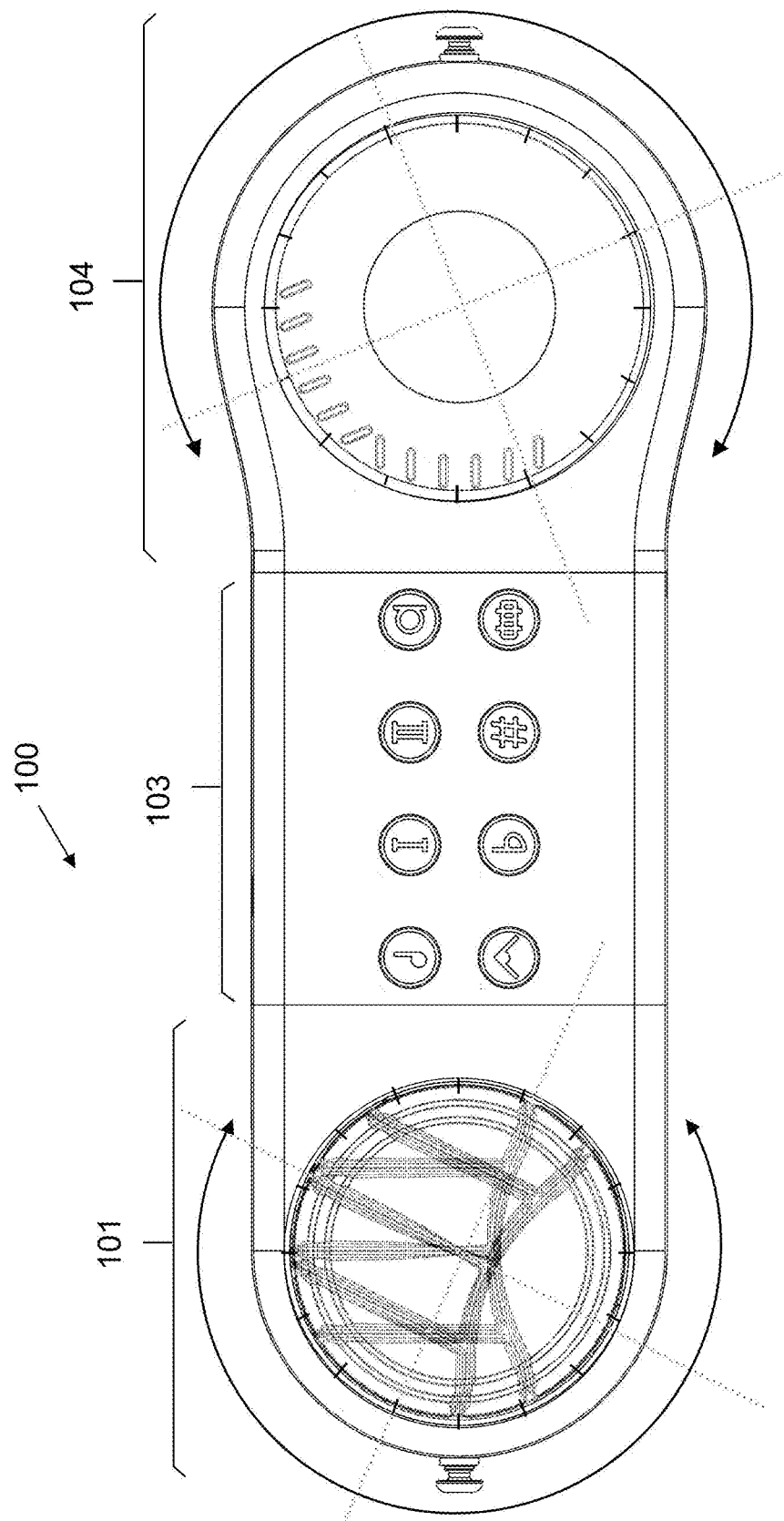
FIG. 12 shows an arrangement where the plate of keys unit and/or joystick unit comprises a rotation mechanism for rotating them clockwise or counterclockwise around its vertical central axis.

In an embodiment, the plate of keys unit 101 and/or unit 104 comprises an adjustable angular rotation mechanism (in a horizontal plane) for rotating them clockwise or counter-clockwise around its vertical central axis, enabling almost 360 degrees rotation, in order to provide adjustment to left and right hand players and to provide optimal adaptation to the player's preferences or limitations, as can be seen in FIG. 12.

Figure 13:
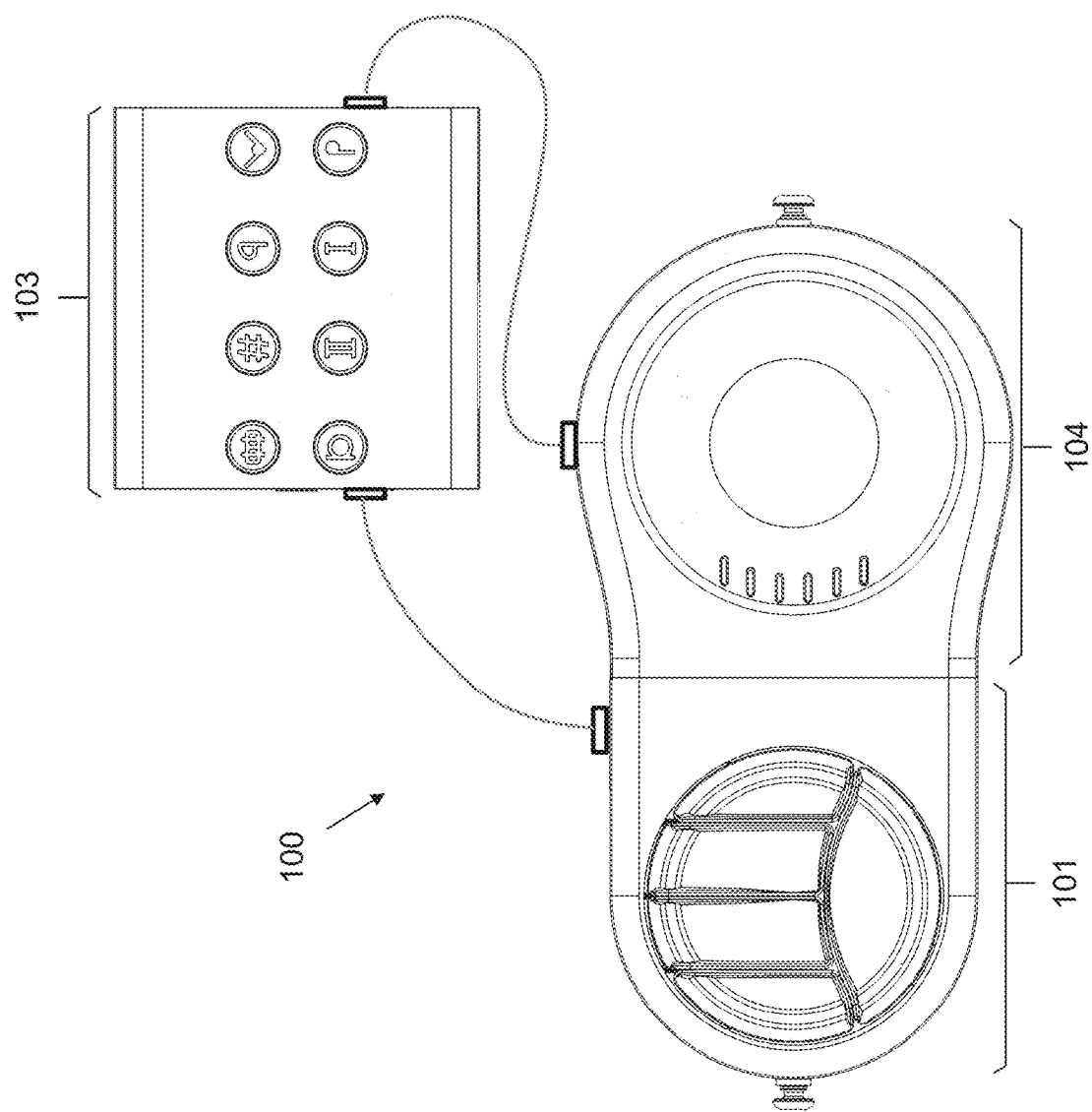
FIG. 13 shows an embodiment, in which units are directly attached to each other to form a unified body, while the processing unit is remote.

FIG. 13 shows an embodiment, in which units 101 and 104 are directly attached to each other to form a unified piece, while the processing unit 103 is remote. In this case, data from units 101 and 104 is transmitted to processing unit 103 via wired or wireless communication (each of the unit may comprise a short-range transceiver, such as Bluetooth).

Figure 14:
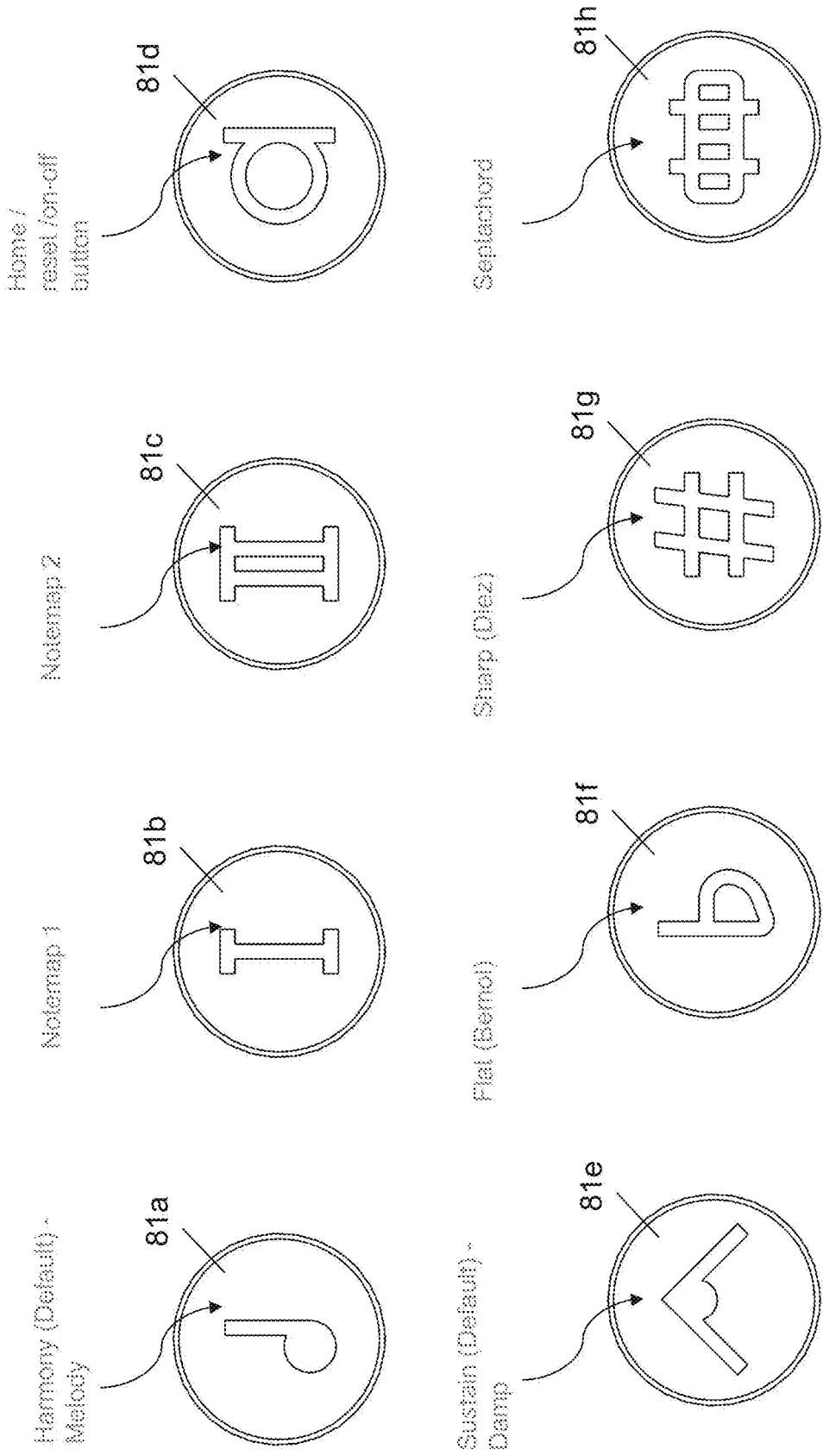
FIG. 14 shows an example of eight input buttons for settings.

FIG. 14 shows an example of eight input buttons 81a-81h for settings. Each input button is marked with a corresponding symbol to obtained a predetermined effect, when pressed by the player. In this example, the symbols are:

81a: Harmony (Default)—Melody
81b: Notemap 1/on-off
81c: Notemap 2
81d: Home/reset/on-off button
81e: Sustain (Default)—Damp

81*f*: Flat (Bemol)
81*g*: Sharp (Diez)
81*h*: Septachord

Figure 15:
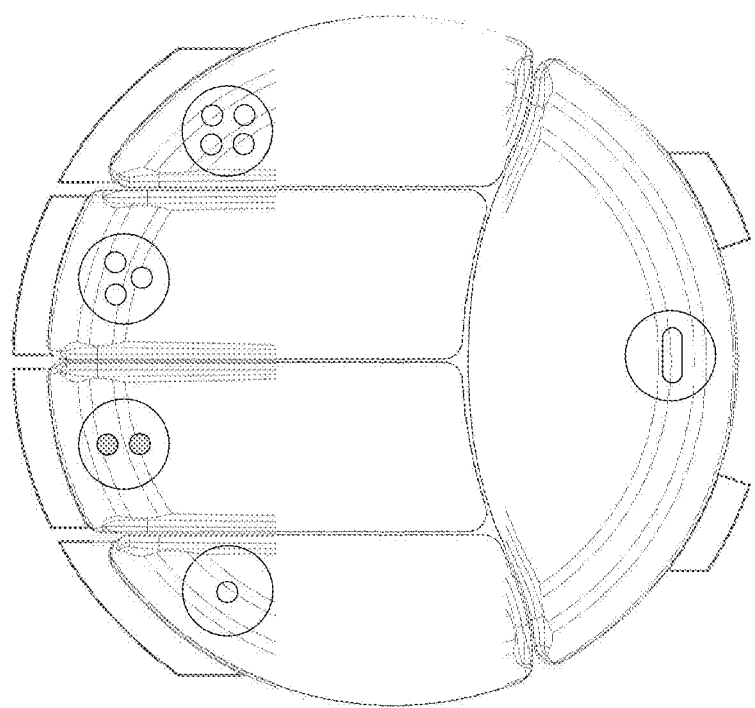
FIG. 15 shows an arrangement with a unique marking on each key.

FIG. 15 shows an arrangement with a unique marking on each key which may be implemented both as colored symbols and as tactile elements.

Figure 16:
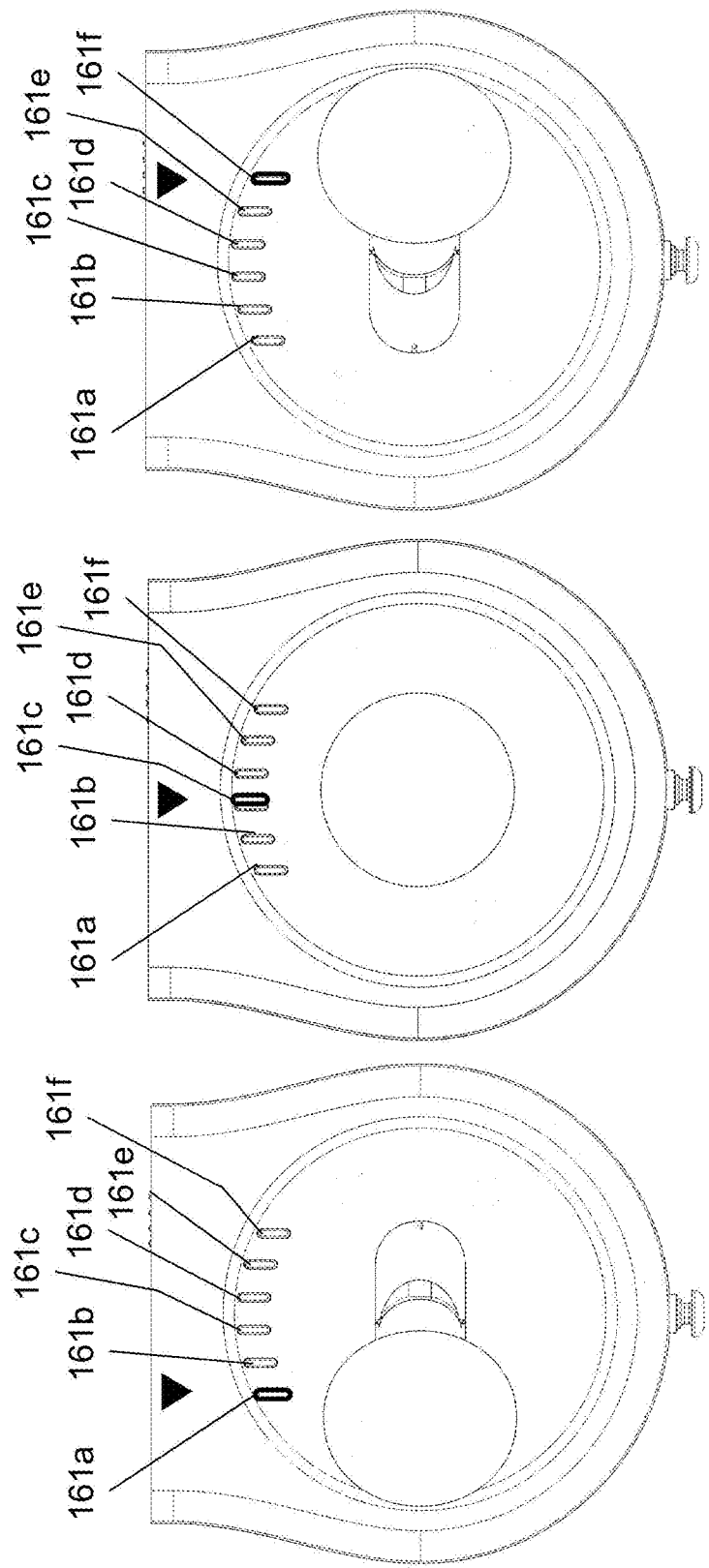
FIG. 16 shows an arrangement with LED light indicators, for each discrete possible position of the joystick.

FIG. 16 shows an arrangement with LED light indicators, for each discrete possible position of joystick 105.

Figure 17:
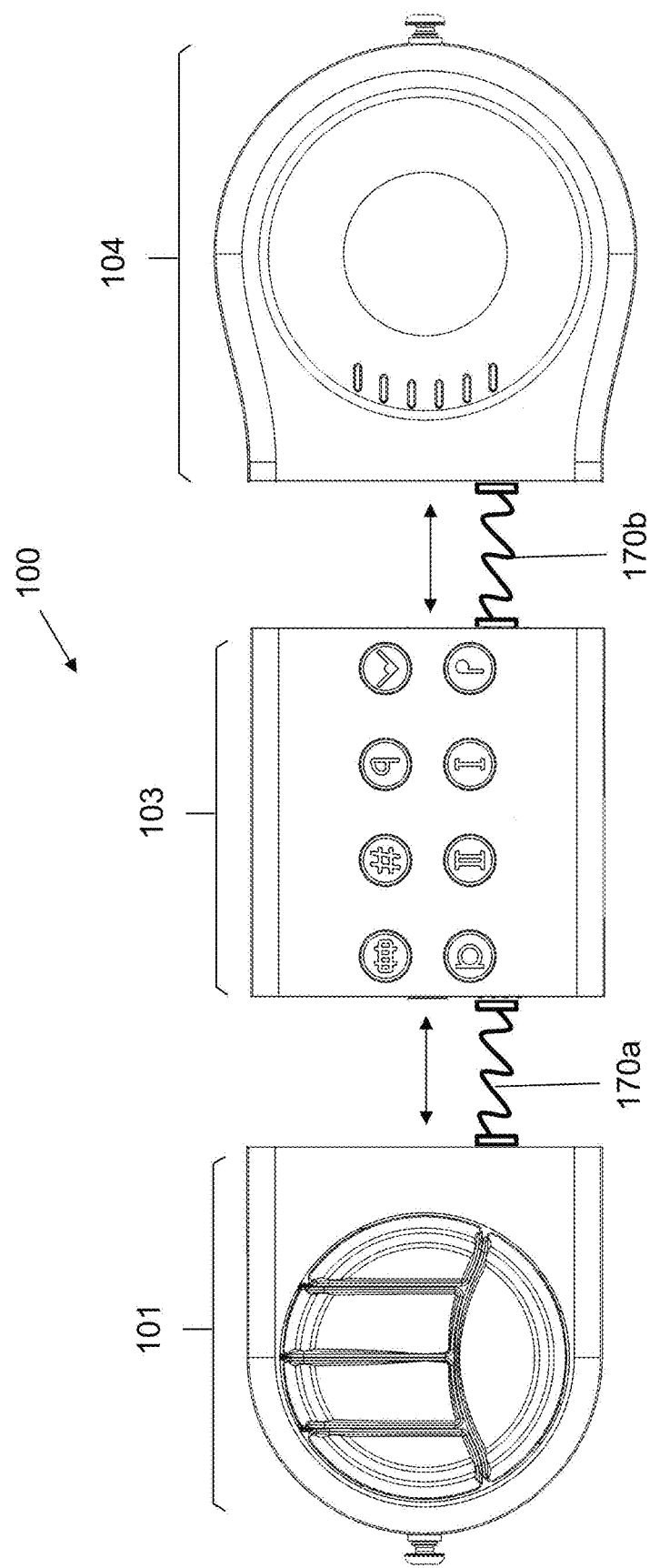
FIG. 17 shows an arrangement where the total length of the input device is adjusted by displacing units, while still maintaining electrical connection via wired or wireless connections.

FIG. 17 shows an arrangement where the separated units of the input device 100 are adjusted by displacing units 101 and 104 from unit 103, while still maintaining electrical connection via wired or wireless connections.

Figure 18:
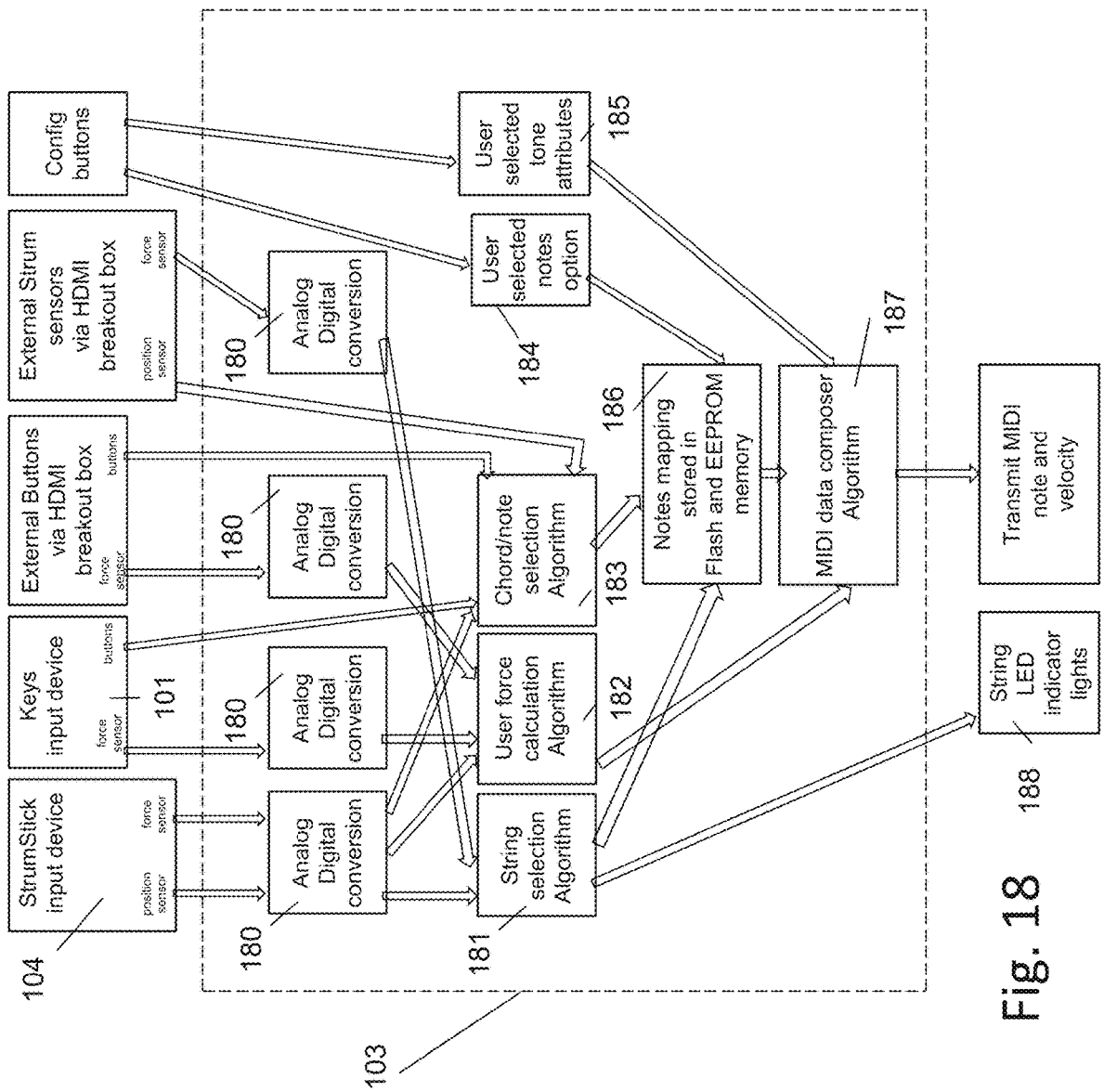
FIG. 18 is a block diagram of the processing unit, according to an embodiment of the invention.

FIG. 18 is a block diagram of the processing unit 103. The processing unit 103 comprises inputs, output and a set of four Analog to Digital converters 180 which receive analog signals from the inputs and converts them to a digital format, required for processing. Processing unit 103 also comprises a processor which consists of: a string selection module 181 (for running a string selection algorithm); a force calculation module 182 (for running a calculation algorithm of the force applied by the player); a chord/note selection module 183 (for running chord/note selection algorithm); a user selected notes module 184 (for selecting note options); a user selected tone module 185 (for defining tone attributes); a note mapping module 186 (for deciding to which chord the player intended and in which magnitude); a Musical Instrument Digital Interface (MIDI—a technical standard that describes a communications protocol, digital interface, and electrical connectors that connect a wide variety of electronic musical instruments, computers, and related audio devices for playing, editing and recording music) data composing module 187 (for converting the data generated by the note mapping module 186 to MIDI protocol and transmitting this data to to a tone generating unit 110); a string LED indicator 188 for providing a visual indication (light) regarding the current position of joystick 105.

String selection module 181 receives inputs regarding emulated strumming operations by reading the position of joystick 105 and the force applied to joystick 105 for reaching each position. This module detects which string the player strummed and send the related data to note mapping module 186 and to a string LED indicator 188 for turning on the appropriate LED (showing the current stick position).

Force calculation module 182 receives data from force sensors attached to keys 102*a*-102*e* and to joystick 105, calculates the force applied by the player and forwards the data regarding applied forces to data composing module 187.

Chord/note selection module 183 receives data regarding pressed keys and strummed joystick positions from all inputs, including external input switches (mostly used by players with severe motoric limitations that play with their head or legs) processes the received data and decides which chord has been selected by the player. Data regarding this decision is also forwarded to note mapping module 186. External inputs may be required of the player has such disabilities that do not allow him to use all keys or joystick 105. In this case, external inputs may be used. For example, if the player uses a wheelchair with inherent operating buttons and joystick (for controlling the wheelchair), the same inherent operating buttons and joystick may be used to provide inputs instead of key plate unit 101 or joystick unit 104.

User selected notes module 184 receives selected tone and notes attributes from configuration buttons 81*a*-81*h* forwards them to note mapping module 186, which jointly processes all the received data to decide which note should be played at any timing and in which magnitude. This data is then forwarded to MIDI data composing module 187, which converts it to MIDI protocol and transmits this data to to a tone generating unit 110. String LED indicator 188 receives data regarding string selection from joystick 105 and turn on corresponding lights in LED indicator 188. This way, processing unit 103 generates characteristic signals which are adapted to an individual playing style of each player.

In an embodiment of the invention, each key (102*a*, . . . , 102*e*) is attached to switches and force sensors, in a way that not only the pressure of the players on the key is sensed, but also the exact location of the pressure on the key is detected. This feature enables a large musical expression of the player by very gentle changes of the sound. This feature can be equivalent for example to vibrating the strings of a violin. The plate of keys 101 can be easily removed and replaced with several configurations and personally adapted to the player.

The height of each key may be adjusted vertically to fit the various finger length and positions. Vertical adjustment is achieved by adding or removing modular spacers to each key.

Operation of the Processing Unit 103

In one embodiment, the processing unit 103 automatically detects player's skill level and adjusts the musical complexity of the instrument accordingly (e.g., from a beginner level to an advanced level). This feature is required since there are many attributes that differentiate between the performance of a novice player and a professional musician (such as a teacher).

According to one embodiment, various attributes are monitored in real-time at a rate or 10,000 times per second (10 KHz). The collected data is then analyzed and processed (e.g., by a computer or an external processor), and the behavior of the input device is adjusted accordingly.

The monitored attributes may include one or more of the following:

Playing in rhythm—"in time" (in a constant tempo, which is speed or pace of a given musical segment)
Dissonance tones
Consistent controlled velocity
Playing in-time in various tempos persistently The processing unit 103 may be adapted to automatically detect the player's physical-reach range, in order to adjust the mapping of tones and activate ranges of the Keys and Strum Stick accordingly. All movable controllers of the input device 100 like the Strum Stick, keys, sliders, knobs and buttons have electronic movement sensors, for measuring their exact position. The input device 100 is initially factory calibrated for maximum range. As the player starts playing with the input device, movement sensors and appropriate software module measure the maximum physically activated range of every controller. The ranges of the Keys and Strum Stick tone mapping is then adjusted accordingly.

The processing unit 103 may also be adapted to automatically detect the player's physical force range (termed "sensitivity"), and to adjust the sensitivity range of Keys and other buttons according, to enable the maximum expression range possible per player's ability.

The processing unit 103 may also be adapted to:
1. Detect and filter of involuntary movements
2. Mute disharmonious tones (e.g., by simulating guitar muting techniques)
3. Predict velocity to minimize latency In one embodiment, all pressable controllers of the input device like the Keys and Strum Stick handle, are covered and connected to with electronic force sensors (Touch), constantly measuring the force applied by the player. The input device 100 is initially factory calibrated for maximum force range. As the player starts playing the input device, electronics and software measure range sensitivity of force applied. Performance velocity ranges of Keys and Strum Stick are set accordingly.

The input device 100 scans all keys and controllers at a rate of 10 Kz, thereby sampling the player's performance. The result of this scan is a profile of the player's skill level and song attributes (tempo, dynamics, harmonics).

Any performance triggers or Key-presses outside the acceptable tones and dynamic range within the song profile and player skill are rejected and filtered out.

The processing unit 103 may also be adapted to automatically mute disharmonious tones (since the player may not have the physical ability to perform this task) and applies software code to simulate muting of disharmonious tones when playing different chords sequentially.

The processing unit 103 may also be adapted to automatically perform velocity prediction, in order to minimize latency. A predictive software code is applied to "close gaps" of physical delaying properties. For example, it takes about 10 ms for a key to be pressed, from the time the button plane was touched, to the time the button traveled to its mechanical stop point. With the electronic embedded force sensors covering the keys, it is possible to measure the force of the finger's tissue on the key (squished, squeezed) even before the key has actually moved. Analyzing and processing these initial measurements enable us to "predict the future", and trigger the playing of the tone at the player's intended velocity after the system has completed all required data processing, without creating noticeable latency (4-5 ms).

Since the key physically starts moving after ~10 ms, there are 5 ms to play/sound the tone in order to keep the latency undetected. The input device 100 provides a pre-press measurement period of 10 ms to predict at what force the key will be pressed after it travelled to a physical stop.

This 10 ms "headstart" enables to execute assistive features while keeping latency undetected to deliver a realistic playing experience.

Operation of the Variable Tension Stick Unit 104

In the following the description refers to the example of a guitar, however, the musical instrument, when fed by the input device, may be imitating any other musical instrument such as percussion instruments, brass instruments etc.

The variable tension joystick 105 is a special joystick, the movement of which is not continuous. The joystick 105 can move in three axes and enables to switch between six states (or 8 states including inactive positions), where each state imitates a string and enables the player to feel the musical behavior of a real musical instrument. The joystick 105 can also be adapted to switch between four states only by disabling two states, and by that to imitate a string instrument with four strings only.

The joystick movement tension be adapted to the use from players with very gentle movement force to players with very strong movement force. This feature is meaningful as players with disabilities are sometimes limited to use only a part of their body, which lacks the necessary sensitivity to play music with traditional musical instruments. For example: a player which can only move his leg will have very strong movement force of the joystick by his leg.

The input device 100 is ergonomic and it can be adapted to the personal range of motion cognitive abilities of the player. This input device enables players with disabilities (or any other players) to experience and enjoy playing music and to learn music as equals to normal players.

The advantageous features of the proposed input device 100 are:

1. The ability of producing a wide range of sounds using a small range of motions: the input device 100 enables to play and remember a wide range of sounds, using a minimal movement of 60° of the strumming part and a pressing of five keys with the pressing part.
2. The input device 100 has the capability to be adapted to various body parts. It can be adapted to situations where the player can control one hand and the head or one leg and the head, one hand and one leg, etc. the input device 100 can also communicate with external accessories and existing interfaces to enable any player that can generate two simultaneous movements to play music.
3. The input device is adapted to a variety of movement disabilities. It can be personally adapted to each player and to the specific disability of said player, both in adapting the force required to operate the strum stick 105 and in terms of adjusting the heights of the keys or changing the surface area of the keys. The input device 103 can also be adjusted to the player by changing its dimensions and the way of gripping its different parts.
4. The input device 100 can be adjusted to different ages of use and to various cognitive abilities. The musical content can be changed in terms of the software and in term of the mechanics of the input device and the number of element necessary to play with.
5. The input device 100 enables the user to develop "muscle memory". The strum stick 105 comprises a "haptic feeling".
6. The input device 100 enables to play monophonic and polyphonic music.

The input device 100 may operate in several modes of use, which are adapted to different types of players with different kinds of disabilities.

Preset: GUITAR Harmony FULL Mode

The preset full mode is adjusted to players with limited mobility but with no harm in the cognitive ability. In this mode of use, it is required to operate two fingers simultaneously, or three body part simultaneously by means of external accessories.

The range of tones in the preset full mode starts from low octave Mi to high Octave La (two and a half octaves—Do Re Me Fa Sol . . . ), where each key or combination of keys changes the tone arrangement as a position of a chord. The tones arrangement is equal to the positions of guitar chords in an "open" mode and the theory of the voice transmission and the strumming types are the same as in guitar.

Harmonic diagram: Every pressure changes the arrangement of the keys and the strum stick simultaneously in the six different modes of the strum stick, similar to a guitar strings and fretted fingerboards.

Preset: GUITAR Harmony Mode

The present harmony mode is adapted to players with limited mobility which their cognitive ability was impaired, or to players which use the input device with their head or their legs or to very young players (in the age of 5-8). In this mode the input device is reduced to three keys and to four states in the strum stick, increasing the surface area of the keys and reducing the strumming movement.

The range of tones in this preset mode starts with a low "Mi" to high "Sol" (two and a half octave) where each key or combination of keys changes the tone arrangement as a position of a chord. The tones arrangement is equal to the positions of guitar chords in an "open" mode and in a four strings mode. The theory of the voice transmission and the strumming types are the same as in guitar, however in this mode the software is used to fill a larger space of musical repertoire and focuses on making it easier for the player to play music.

Preset: Melody Chromatic Mode

The present melody chromatic mode is adapted to players with limited mobility which their cognitive ability was not limited/impaired. In this mode it is needed to operate two fingers simultaneously or three body part simultaneously by means of aid. This mode enables to play solos and melody lines similar to a guitar, and the tones arrangement and the visual shape is the same as the positions in a guitar.

As in a guitar, the tonal intervals between the keys are semitones and every state in the strum stick represents string of guitar. In every state, five sounds can be generated with intervals of 2.5 tones.

This state enables playing in different scales and similar positions to the classic musical and visual method of a guitar.

Preset: Melody Mode

The preset melody mode is adapted to players with limited mobility which their cognitive ability was impaired, or to players which use the input device with their head or their legs or to very young players (in the age of 5-8). In this mode the input device is reduced to three keys and to four states in the strum stick, increasing the surface area of the keys and reducing the strumming movement. This mode enables to play solos and melody lines similar to a guitar.

The tones arrangement in this mode will be in changing states in the control of the player (which are switches in the processing unit of the input device) and includes pentatonic scales, blues, major and minor in range of up to two octaves.

This mode enables playing in different scales and similar positions to the classic musical and visual method of a guitar.

Preset: Bass Mode

This mode is generally adapted to players with disabilities. It allows players to choose between a wide variety of string instruments and their different character.

Like the bass guitar, the tonal distances between the keys are half a ton, and every state in the strum stick represents a guitar string. In every state, five sounds can be generated with distance of 2.5 tones.

This mode enables playing in different scales and similar positions to the musical and visual method of a bass guitar.

There are also two other modes of preset ukulele and preset strings.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. An input device for operating a musical instrument having musical behavior of string instruments, comprising:
   a) a key plate unit containing a set of input keys to be pressed by a player, in order to generate a first set of electric input signals, which emulate a combination of pressed keys of a musical instrument or a combination of pressed strings;
   b) a stick unit with variable tension of displacement comprising:
      b.1) a stick to be moved by said player between predetermined discrete positions, which emulate a combination of strummed strings of a musical instrument;
      b.1) a set of electric contacts, each corresponding to a different discrete position, for transmitting stick position signals;
   c) a processing unit comprising:
      c.1) input buttons for setting musical parameters;
      c.2) a first set of interface inputs for receiving said stick position signals;
      c.3) a second set of interface inputs for receiving said first set of electric input signals;
      c.4) a memory for storing processing software;
      c.5) at least one processor, connected to said memory, for jointly processing said stick position signals and said first set of electric input signals using said processing software, and for outputting electric output signals representing codes of musical notes that corresponds to movements of said input keys between pressed and released positions, and movements of said stick between said discrete positions;
   d) one or more interface connections, for transmitting electric output signals representing codes of musical notes, from said processing unit to a computerized tone generating unit that converts said electric output signals to sounds.

2. An input device according to claim 1, further comprising a set of movement sensors, attached to at least a part of said input keys and/or to said stick, for sensing data representing movement parameters of said keys or said stick and providing said data to the processing unit.

3. An input device according to claim 2, in which the processing unit is adapted to:
   a) jointly process, using said processing software, the stick position signals, the first set of electric input signals and the movement parameters; and
   b) output electric output signals representing codes of musical notes that corresponds to a specific player using characteristic movements of said input keys between pressed and released positions, and characteristic movements of said stick between said discrete positions.

4. An input device according to claim 3, in which the movement parameters include one or more of the following:
   a) displacement velocity;
   b) applied force on any key;
   c) applied force on the joystick.

5. An input device according to claim 1, in which signals are transmitted using wired or wireless transmission.

6. An input device according to claim 1, in which the tone generating unit is selected from the group of:
   a synthesizer;
   a computer;
   a smartphone;
   internal sound generator;
   a tablet.

7. An input device according to claim 1, further comprising electric sockets to receive cables or wires, to be connected to the tone generating unit, for transmitting the generated signals.

8. An input device according to claim 1, further comprising a short-range wireless connection to the tone generating unit, for transmitting the generated signals.

9. An input device according to claim 1, in which some of the sockets/connectors also enable connection of additional external input devices to the processing unit, selected from the group of:
- head switches;
- foot switches;
- big button switches;
- eye tracking sensors;
- proximity sensors.

10. An input device according to claim 1, in which all the parts are attached to each other, to form a single body assembly.

11. An input device according to claim 1, which is implemented as a single unified body.

12. An input device according to claim 1, in which each part is adapted to be rotated and the tilt angle of each part can be changed according to the necessities of the player.

13. An input device according to claim 1, being a modular component in which each part can be disconnected from the other parts, and still communicate with them through wired or wireless communication means.

14. An input device according to claim 1, in which orientation is adjusted by rotating or tilting the key plate unit and the stick unit with respect to the processing unit.

15. An input device according to claim 1, in which the plate unit and the stick unit are directly attached to each other to form a unified body, while the processing unit is remote.

16. An input device according to claim 1, in which the variable tension stick unit comprises:
   a) a string board with several spaced semi-tubular grooves, each formed in a different angle, which corresponds to a discrete possible position of a stick;
   b) a stick consisting of a replaceable modular handle that rotates a pivotal rod around a fixed pivot, responsive to the movement and force applied by a player; and
   c) a stopper that restrict the movement of said pivotal in a discrete position when aligned with one of said tubular grooves.

17. An input device according to claim 1, in which the stopper comprises:
   a) a tubular body to which a ball is inserted, along with a spring that pushes a push pin with its distal end and a fixation holder that is permanently mounted inside said tubular body to its internal cylindrical wall;
   b) a spring adjustor being a screw which is inserted into a corresponding thread formed in said fixation holder;
   c) a tubular flange for pushing the proximal end of said spring;
   d) a push pin for pushing said ball the against string board in a force that is determined by said spring adjustor;
   e) an array of proximity sensors for providing an electrical signal to the processing unit to generate a visual indication regarding the current discrete position of said stick,
   wherein whenever the player pushes said handle, tubular body rotates and causes said ball to travel in an arcuate path on the grooved surface of said string board, such that whenever the center said ball coincides with the center of a groove in said string board, said ball is pushed into a groove, in order to resist the rotation at that position.

18. An input device according to claim 1, in which the musical parameters are selected from the group of:
- tone duration;
- flat musical scale selection;
- harmonic/melodic playing mode.

19. An input device according to claim 1, in which the two side margin grooves in the string board correspond to two inactive positions, for allowing the player to be outside the strumming sequence whenever the stick exceeds the last position in each direction.

* * * * *